(12) United States Patent
Takaku et al.

(10) Patent No.: US 7,713,437 B2
(45) Date of Patent: *May 11, 2010

(54) LIQUID CRYSTAL COMPOSITION, LIQUID CRYSTAL ELEMENT, REFLECTIVE DISPLAY MATERIAL, AND LIGHT-CONTROLLING MATERIAL

(75) Inventors: Koji Takaku, Kanagawa (JP); Takashi Kato, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 91 days.

This patent is subject to a terminal disclaimer.

(21) Appl. No.: 11/806,242

(22) Filed: May 30, 2007

(65) Prior Publication Data

US 2007/0278449 A1 Dec. 6, 2007

(30) Foreign Application Priority Data

May 31, 2006 (JP) .............................. 2006-152327

(51) Int. Cl.
C09K 19/00 (2006.01)
C09K 19/06 (2006.01)
C09K 19/52 (2006.01)

(52) U.S. Cl. ............................. 252/299.01; 252/299.6; 430/20; 428/1.1; 349/184; 349/186

(58) Field of Classification Search ................. 349/184, 349/186; 430/20; 252/299.01, 299.6; 428/1.1
See application file for complete search history.

(56) References Cited

U.S. PATENT DOCUMENTS

| 5,621,552 | A | 4/1997 | Coates et al. |
| 7,220,466 | B2 | 5/2007 | Katoh et al. |
| 7,338,690 | B2 * | 3/2008 | Takaku et al. ................ 428/1.1 |
| 7,348,044 | B2 * | 3/2008 | Takaku et al. ................ 428/1.1 |
| 7,402,331 | B2 * | 7/2008 | Takaku et al. ................ 428/1.1 |

FOREIGN PATENT DOCUMENTS

| JP | 5-216018 A | | 8/1993 |
| JP | 10195445 A | * | 7/1998 |
| JP | 2000-347224 A | | 12/2000 |
| JP | 2004-75821 A | | 3/2004 |

OTHER PUBLICATIONS

Bucher et al., "Frequency-addressed liquid crystal field effect". Applied Physics Letters, vol. 25, No. 4, pp. 186 to 188 (1974).
M. Schadt, "Effects of dielectric relaxations and dual-frequency addressing on the electro-optics of guest-host liquid crystal displays". Applied Physics Letters, vol. 41, No. 8, pp. 697 to 699 (1982).
D. Coates, "A Smectic A Phase of Positive and Negative Dielectric Anisotropy". Mol. Cryst. Liq. Cryst., 49, pp. 83-87 (1978).

* cited by examiner

*Primary Examiner*—Geraldina Visconti
(74) *Attorney, Agent, or Firm*—Birch, Stewart, Kolasch & Birch, LLP

(57) ABSTRACT

The present invention provides a dual frequency addressable smectic A liquid crystal composition having a crossover frequency, wherein the smectic A phase is induced by mixing of at least a first nematic liquid crystal compound or composition and a second nematic liquid crystal compound or composition.

25 Claims, 6 Drawing Sheets

○: WHEN VOLTAGE AT LOW FREQUENCY IS APPLIED
(HORIZONTAL ORIENTATION TO VERTICAL ORIENTATION)

○: WHEN VOLTAGE AT HIGH FREQUENCY IS APPLIED
(VERTICAL ORIENTATION TO HORIZONTAL ORIENTATION)

○ : WHEN VOLTAGE AT LOW FREQUENCY VOLTAGE IS APPLIED
(HORIZONTAL ORIENTATION TO VERTICAL ORIENTATION)

○ : WHEN VOLTAGE AT HIGH FREQUENCY IS APPLIED
(VERTICAL ORIENTATION TO HORIZONTAL ORIENTATION)

LIQUID CRYSTAL COMPOSITION, LIQUID CRYSTAL ELEMENT, REFLECTIVE DISPLAY MATERIAL, AND LIGHT-CONTROLLING MATERIAL

CROSS-REFERENCE TO RELATED APPLICATION

This application claims priority under 35 USC 119 from Japanese Patent Application No. 2006-152327, the disclosure of which is incorporated by reference herein.

BACKGROUND

1. Technical Field

The present invention relates to a liquid crystal composition, a liquid crystal element, a reflective display material, and a light-controlling material, and in particular, to a liquid crystal composition, a liquid crystal element, a reflective display material, and a light-controlling material that are favorably used in guest-host systems.

2. Related Art

Properties demanded for display include high visibility and low power consumption. Display devices in a guest-host system have been known as liquid crystal elements (liquid crystal display elements) satisfying these requirements and are highly anticipated as display devices that allow bright display and are suitable for reflective display. For example, liquid crystal compositions containing a dichroic dye having a particular substituent and a host liquid crystal and display devices in the guest-host system have been disclosed (see, for example, Japanese Patent Application Laid-Open (JP-A) No. 2004-75,821).

However, nematic liquid crystals, which have no memory property, require application of voltage for continuous display. In contrast, a method of using a nonvolatile smectic A liquid crystal having a memory property has been proposed, but this liquid crystal also has a problem in that a large amount of energy, such as heat, is needed for changing a displayed image.

Alternatively, "dual-frequency-addressing methods" are known, in which the orientation of liquid crystal is reversibly changed by an applied electric field by using a dual-frequency-addressable liquid crystal that has a dielectric anisotropy $\Delta\in$ changing from positive to negative when the frequency of the applied voltage is increased (see, for example, Applied Physics Letters, Vol. 25, No. 4, pp. 186 to 188 (1974) and Applied Physics Letters, Vol. 41, No. 8, pp. 697 to 699 (1982)). Some smectic A liquid crystals which enable switching of the orientation of liquid crystal actively and exhibit dual frequency addressing have been reported (see, for example, Mol. Cryst. Liq. Cryst., 49, pp. 83-87 (1978)). However, such a system still has problems of very large voltage being required and slow response time. Accordingly, there exists a demand for a nonvolatile liquid crystal element that responds at low voltage in a short period of time.

Along with increased concern about the environment, materials allowing regulation of light quantity electrically, so-called electrical light-controlling materials, are increasing in importance. For example, electrochromic methods of using an oxidation-reduction reaction and polymer-dispersion liquid crystal (PDLC) methods of using a composite of a liquid crystal and a polymer have been proposed as such electrical light-controlling materials. However, the electrochromic systems have problems concerning the difficulty in increasing the area these of due to addressing with electrical current and remaining issues regarding the durability of the electrochromic colorant, while the PDLC systems are limited in application due to only being able to switch between a scattered white state and a transparent state and at times have a high voltage, and thus both systems still have problems to be overcome.

Light-controlling materials utilizing the guest-host system allow regulation of bright light and are thus attracting attention as a system suited for light-controlling applications. However, since the materials proposed so far (see, for example, JP-A No. 2000-347,224) required high voltage for addressing and do not have a memory property, they consume a large amount of power and still do not have a light-controlling property of a satisfactory level in some cases, and thus further improvement is demanded.

SUMMARY

The present inventions have been made in view of the above circumstances and provide a liquid crystal composition, a liquid crystal element, a reflective display material, and a light-controlling material.

A first aspect of the invention provides a dual frequency addressable smectic A liquid crystal composition having a crossover frequency, comprising at least a first nematic liquid crystal compound or composition and a second nematic liquid crystal compound or composition.

A second aspect of the invention provides a liquid crystal element having a pair of electrodes, at least one of which is a transparent electrode, and a liquid crystal layer held between the pair of electrodes, the liquid crystal layer comprising at least one dual frequency addressable smectic A liquid crystal composition having a crossover frequency containing at least a first nematic liquid crystal compound or composition and a second nematic liquid crystal compound or composition.

BRIEF DESCRIPTION OF THE DRAWINGS

Exemplary embodiments of the present invention will be described in detail based on the following figures, wherein.

DETAILED DESCRIPTION

Figure 1A:
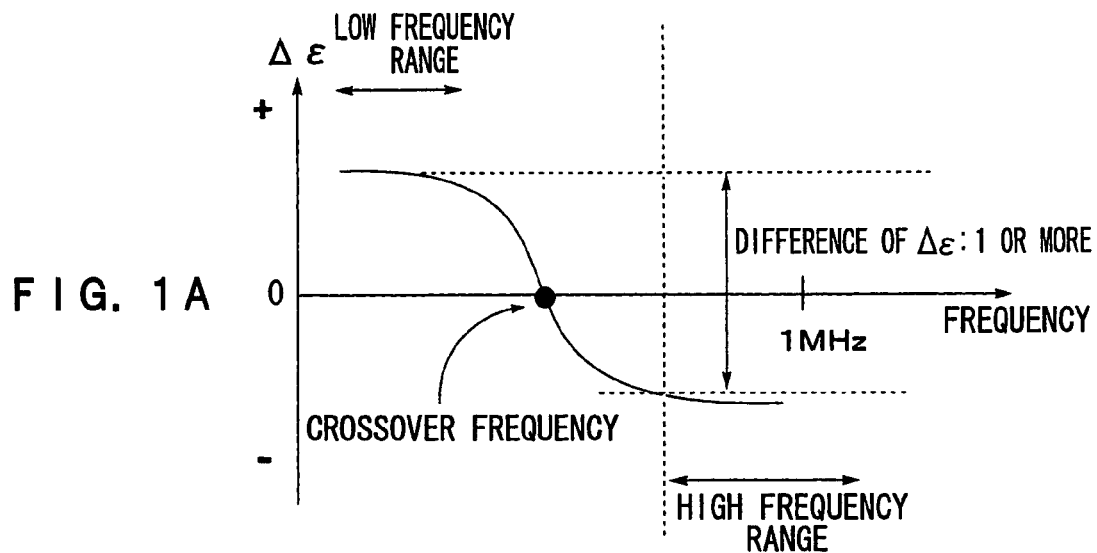
FIG. 1A is a graph showing the dielectric property of a liquid crystal compound or composition for use in the present invention.

The present invention will be described in detail below. In the present specification ". . . to . . . " indicates a range including the numerical values indicated before and after "to" as a minimum value and a maximum value, respectively.

1. Dual Frequency Addressable Smectic A Liquid Crystal Composition

Conventional guest-host systems using a dual frequency addressable nematic liquid crystal have a problem in that the image formed therein is not preserved when no voltage is applied there is no memory property; and, although the dual frequency addressable smectic A liquid crystal compound has a memory property, it has problems in that the viscosity is higher and there is no response unless a high voltage is applied.

After intensive studies, the inventors have found that it is possible to induce a low-viscosity smectic A phase by mixing a particular nematic liquid crystal compound or composition with another particular nematic liquid crystal compound or composition and to give a nonvolatile liquid crystal compound that is extremely effective by low-voltage addressing, and completed the present invention based on these findings.

The invention relates to a dual frequency addressable smectic A liquid crystal composition having a crossover frequency, comprising at least a first nematic liquid crystal compound or composition and a second nematic liquid crystal compound or composition. In the invention, the dual frequency addressable smectic A liquid crystal composition refers to a liquid crystal composition in the smectic A phase at 25° C. that exhibits dual frequency addressing.

The dual frequency addressable smectic A liquid crystal composition is a liquid crystal composition having a smectic A phase induced by mixing of at least a first nematic liquid crystal compound or composition with a second nematic liquid crystal compound or composition that has a crossover frequency and exhibits dual frequency addressing. Thus, it is possible to change its dielectric anisotropy from positive to negative by raising the frequency of the applied voltage.

Generally, a nematic liquid crystal compound is less viscous, while a smectic A phase liquid crystal compound is more viscous and more difficult to handle. Thus, conventional liquid crystal elements using a liquid crystal composition containing a smectic A phase liquid crystal compound required high voltage and had a slower response speed. However, because the liquid crystal composition according to the invention contains a nematic liquid crystal compound as its main liquid crystal compound, the liquid crystal element containing the liquid crystal composition operates under low voltage and has a shorter response time.

1-1. First Nematic Liquid Crystal Compound and Composition

The first nematic liquid crystal compound according to the invention is a liquid crystal compound having a melting point of 60° C. or lower and exhibiting a liquid crystalline phase only in the nematic phase. The first nematic liquid crystal composition is a liquid crystal composition having a melting point of 60° C. or lower and exhibiting a liquid crystalline phase only in the nematic phase, and preferably a liquid crystal composition exhibiting the nematic phase at 25° C. (room temperature). The main liquid crystal compound for use is the first nematic liquid crystal compound described above, but a liquid crystal compound other than the first nematic liquid crystal compound may be added for expansion of the nematic temperature range.

The liquid crystal compound other than the first nematic liquid crystal compound is not particularly limited, and may be a nematic or smectic liquid crystal compound having a melting point 60° C. or higher.

In such a case, the content ratio of the liquid crystal compound other than the first nematic liquid crystal compound, "first nematic liquid crystal compound (total when multiple compounds are present): liquid crystal compound other than the first nematic liquid crystal compound", is preferably 70:30 mol % to 100:0 mol %, more preferably 80:20 mol % to 99:1 mol %, and particularly preferably 90:10 mol % to 99:1 mol %. A liquid crystal compound other than the first nematic liquid crystal compound at a content of more than 30 mol % may have a melting point of 60° C. or higher or give a composition in the smectic phase.

It is possible to determine whether the first nematic liquid crystal compound or composition is in the nematic phase at 25° C. (room temperature) by observing the liquid crystalline phase under a polarization microscope.

The dual frequency addressable smectic A liquid crystal composition according to the invention contains at least one first nematic liquid crystal compound, and thus, the first nematic liquid crystal compounds may be used alone or as a composition in combination of two or more. Other additives may be added thereto additionally.

1-2. Second Nematic Liquid Crystal Compound and Composition

The second nematic liquid crystal compound according to the invention refers to a nematic liquid crystal compound having a polarized group on the molecular major axis of the compound and may be a liquid crystal in the nematic phase or may be in a crystalline state at 25° C. (room temperature). However, if the compound is in a crystaline state at 25° C. (room temperature), it should, when heated, transit from the crystalline state into the nematic phase without forming a smectic phase at any temperature.

The polarized group is preferably a perfluoroalkoxy group having 1 to 10 carbon atoms, and more preferably having 1 to 6 carbon atoms (such as a trifluoromethoxy group or nonafluorobutoxy group), a perfluoroalkyl group having 1 to 10 carbon atoms, and more preferably having 1 to 6 carbon atoms (such as a trifluoromethyl group or nonafluorobutyl group), a halogen atom (such as fluorine or chlorine), or a cyano group.

The second nematic liquid crystal composition according to the invention may be a mixture of plural second nematic liquid crystal compounds mixed for control of the liquid-crystalline temperature range.

It is possible to determine whether the second nematic liquid crystal compound or composition is in the nematic phase at 25° C. (room temperature), similarly to the method above for the first nematic liquid crystal compound or composition.

It is also possible to determine whether the second nematic liquid crystal compound or composition is in the crystalline state at 25° C. (room temperature) and transits to the nematic phase without forming a smectic phase when heated, similarly to the method above.

The dual frequency addressable smectic A liquid crystal composition according to the invention contains at least one second nematic liquid crystal compound or composition, and thus, the second nematic liquid crystal compounds may be used alone or composition may be used.

1-3. Examples of First and Second Nematic Liquid Crystal Compounds

Both the first and second nematic liquid crystal compounds are preferably liquid crystal compounds represented by the following Formula (1). Combined use of the first and second nematic liquid crystal compounds, when they are the liquid crystal compounds represented by the following Formula (1), induces the smectic A phase easily and thus favorable.

In addition, use of liquid crystal compounds similar in skeleton leads to stabilization of the liquid crystalline phase when the compounds are mixed, giving dual frequency addressable smectic A liquid crystal composition uniformly mixed.

$$T^1\text{-}((D^1)_e\text{-}(L^1)_j)_m\text{-}(D^2)_k\text{-}T^2 \qquad \text{Formula (1):}$$

In the Formula (1), $D^1$ and $D^2$ each independently represents an arylene group, a heteroarylene group or a bivalent alicyclic hydrocarbon group.

The arylene group represented by $D^1$ or $D^2$ is preferably an arylene group having 6 to 20 carbon atoms, more preferably having 6 to 10 carbon atoms. Preferred examples of the arylene groups include phenylene and naphthalene groups such as 1,4-phenylene, naphthalen-2,6-diyl, and tetrahydronaphthalen-2,6-diyl.

The heteroarylene group represented by $D^1$ or $D^2$ is preferably a heteroarylene group having 1 to 20 carbon atoms, more preferably having 2 to 9 carbon atoms. Preferred examples of the heteroarylene groups include heteroarylene groups, such as pyridine ring, quinoline ring, isoquinoline ring, pyrimidine ring, pyrazine ring, thiophene ring, furan ring, oxazole ring, thiazole ring, imidazole ring, pyrazole ring, oxadiazole ring, thiadiazole ring and triazole ring and fused rings thereof, of which two hydrogen atoms are removed respectively from two carbon atom.

The bivalent alicyclic hydrocarbon group represented by $D^1$ or $D^2$ is preferably a bivalent alicyclic hydrocarbon group having 3 to 20 carbon atoms, more preferably having 4 to 12 carbon atoms. Preferred examples of the bivalent alicyclic hydrocarbon groups include cyclohexandiyl and decahydronaphthalendiyl, more preferably cyclohexane-1,4-diyl and decahydronaphthalen-2,6-diyl.

The bivalent arylene group, the bivalent heteroarylene group and the bivalent alicyclic hydrocarbon group represented by $D^1$ or $D^2$ may have be substituted or unsubstituted. In the Formula (1), when e, m or k is 2 or more, multiple groups $D^1$ or $D^2$ may be substituted or unsubstituted independently, and the multiple substituents may be the same as or different from each other. Examples of the substituent groups include the following substituent groups V.

(Substituent Group V)

The substituent group V includes, for example, a halogen atom (for example, chlorine, bromine, iodine, or fluorine), a mercapto group, a cyano group, a carboxyl group, a phosphate group, a sulfo group, a hydroxy group, a carbamoyl group having 1 to 10 carbon atoms, preferably 2 to 8 carbon atoms, more preferably 2 to 5 carbon atoms (for example, methylcarbamoyl, ethylcarbamoyl, and morpholinocarbamoyl), a sulfamoyl group having 0 to 10 carbon atoms, preferably 2 to 8 carbon atoms, more preferably 2 to 5 carbon atoms, (for example, methylsulfamoyl, ethylsulfamoyl and piperidinosulfamoyl), a nitro group, an alkoxy group having 1 to 20 carbon atoms, preferably 1 to 10 carbon atoms, more preferably 1 to 8 carbon atoms (for example, methoxy, ethoxy, 2-methoxyethoxy and 2-phenylethoxy), an aryloxy group having 6 to 20 carbon atoms, preferably 6 to 12 carbon atoms, more preferably 6 to 10 carbon atoms (for example, phenoxy, p-methylphenoxy, p-chlorophenoxy, and naphthoxy), an acyl group having 1 to 20 carbon atoms, preferably 2 to 12 carbon atoms, more preferably 2 to 8 carbon atoms, (for example, acetyl, benzoyl and trichloroacetyl), an acyloxy group having 1 to 20 carbon atoms, preferably 2 to 12 carbon atoms, more preferably 2 to 8 carbon atoms (for example, acetyloxy and benzoyloxy), an acylamino group having 1 to 20 carbon atoms, preferably 2 to 12 carbon atoms, more preferably 2 to 8 carbon atoms (for example, acetylamino), a sulfonyl group having 1 to 20 carbon atoms, preferably 1 to 10 carbon atoms, more preferably 1 to 8 carbon atoms (for example, methane sulfonyl, ethane sulfonyl and benzenze sulfonyl), a sulfinyl group having 1 to 20 carbon atoms, preferably 1 to 10 carbon atoms, more preferably 1 to 8 carbon atoms (for example, methanesulfinyl, ethanesulfinyl, and benzenesulfinyl), a substituted or unsubstituted amino group having 1 to 20 carbon atoms, preferably 1 to 12 carbon atoms, more preferably 1 to 8 carbon atoms (for example, amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethylphenylamino, 4-trifluoromethylphenylamino, 2-pyridylaamino, 3-pyridylamino, 2-thiazorylamino, 2-oxazorylamino, N,N-methylphenylamino, and N,N-ethylphenylamino), an ammonium group having 0 to 15 carbon atoms, preferably 3 to 10 carbon atoms, more preferably 3 to 6 carbon atoms (for example, trimetylammonium, and triethyl ammonium), a hydrazino group having 0 to 15 carbon atoms, preferably 1 to 10 carbon atoms, and more preferably 1 to 6 carbon atoms (for example, trimethyl hydrazino group), an ureido group having 1 to 15 carbon atoms, preferably 1 to 10 carbon atoms, more preferably 1 to 6 carbon atoms (for example, ureido group, and N,N-dimethylureido group), an imido group having 1 to 15 carbon atoms, and preferably 1 to 10 carbon atoms, more preferably 1 to 6 carbon atoms (for example, succineimide group), an alkylthio group having 1 to 20 carbon atoms, preferably 1 to 12 carbon atoms, more preferably 1 to 8 carbon atoms (for example, methylthio, ethylthio, and propylthio), an arylthio group having 6 to 80 carbon atoms, preferably 6 to 40 carbon atoms, more preferably 6 to 30 carbon atoms (for example, phenylthio, p-methylphenylthio, p-chlorophenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio, and 4-propylphenyl-2-ethynyl-4'-biphenylthio), a heteroarylthio group having 1 to 80 carbon atoms, preferably 1 to 40 carbon atoms, more preferably 1 to 30 carbon atoms (for example, 2-pyridylthio, 3-pyridylthio, 4-pyridylthio, 2-quinorylthio, 2-furylthio, or 2-pyrolylthio), an alkoxycarbonyl group having 2 to 20 carbon atoms, preferably 2 to 12 carbon atoms, more preferably 2 to 8 carbon atoms (for example, methoxycarbonyl, ethoxycarbonyl, and 2-benzyloxycarbonyl), an aryloxycarbonyl group having 6 to 20 carbon atoms, preferably 6 to 12 carbon atoms, more preferably 6 to 10 carbon atoms (for example, phenoxycarbonyl), an unsubstituted alkyl group having 1 to 18 carbon atoms, preferably 1 to 10 carbon atoms, more preferably 1 to 5 carbon atoms (for example, methyl, ethyl, propyl, and butyl), a substituted alkyl group having 1 to 18 carbon atoms, preferably 1 to 10 carbon atoms, more preferably 1 to 5 carbon atoms (for example, hydroxymethyl, trifluoromethyl, benzyl, carboxyethyl, ethoxycarbonylmethyl, and acetylaminomethyl, provided that the substituted alkyl group includes an unsaturated hydrocarbon group having 2 to 18 carbon atoms, preferably 3 to 10 carbon atom, more preferably 3 to 5 carbon atoms (for example, vinyl, ethynyl, 1-cyclohexenyl, benzylidyne, and benzylidene)), a substituted or unsubstituted aryl group having 6 to 20 carbon atoms, preferably 6 to 15 carbon atoms, more preferably 6 to 10 carbon atoms, (for example, phenyl, naphthyl, p-carboxyphenyl, p-nitrophenyl, 3,5-dichlorophenyl, p-cyanophenyl, m-fluorophenyl, p-tolyl, 4-propylcyclohexyl-4'-biphenyl, 4-butylcyclohexyl-4'-biphenyl, 4-pentylcyclohexyl-4'-biphenyl, and 4-propylphenyl-2-ethynyl-4'-biphenyl), a substituted or unsubstituted heteroaryl group having 1 to 20 carbon atoms, preferably 2 to 10 carbon atoms, more preferably 4 to 6 carbon atoms (for example, pyridyl, 5-methylpyridyl, thienyl, furyl, morpholino, and tetrahydrofurfuryl).

Those substituent groups V may have a structure in which a benzene ring or a naphthalene ring is condensed. Further, the substituent illustrated by the explanation for V explained so far may further be substituted on the substituents described above.

Among the groups in the substituent groups V, the substituent groups for the bivalent arylene group, the bivalent heteroarylene group and the bivalent alicyclic hydrocarbon group represented by $D^1$ and $D^2$ are preferable alkyl group, alkoxy group, halogen atom, and a cyano group.

In the Formula (1), $L^1$ represents a bivalent connecting group, preferably, an alkandiyl group, alkenylene group, alkynylene group, ether group, ester group, carbonyl group, azo group, azoxy group, or alkyleneoxy group, and more preferably, an alkandiyl group (such as ethylene group), an alkynylene group (such as ethynylene group), or an ester group.

In the Formula (1), $T^1$ and $T^2$ each independently represents a hydrogen atom, an alkyl group, an alkoxy group, an alkoxycarbonyl group, an acyl group, an acyloxy group, a halogen atom or a cyano group. $T^1$ preferably represents an alkyl group having 1 to 30 carbon atoms, more preferably having 3 to 20 carbon atoms, and still more preferably having 3 to 10 carbon atoms (such as n-propyl group, n-butyl group, n-pentyl group, or n-hexyl group); an alkoxy group having 1 to 30 carbon atoms, more preferably having 3 to 20 carbon atoms, and still more preferably having 3 to 10 carbon atoms (such as n-propyloxy group, n-butoxy group, n-pentyloxy group, or n-hexyloxy group; or a halogen atom (such as fluorine and chlorine).

Favorable $T^2$ in the first and second nematic liquid crystal compounds according to the invention are different from each other, and favorable $T^2$ in the first nematic liquid crystal compound include alkyl groups having 1 to 30 carbon atoms, more preferably having 3 to 20 carbon atoms, and still more preferably having 3-10 carbon atoms (such as n-propyl group, n-butyl group, n-pentyl group, n-hexyl group, and trifluoromethyl group); alkoxy groups having 1 to 30 carbon atoms, more preferably having 3 to 20 carbon atoms, and still more preferably having 3 to 10 carbon atoms (such as n-propyloxy group, n-butoxy group, n-pentyloxy group, n-hexyloxy group, and trifluoromethoxy group); and halogen atoms (such as fluorine and chlorine).

On the other hand, favorable $T^2$ in the second nematic liquid crystal compound include perfluoroalkoxy groups having 1 to 10 carbon atoms, more preferably having 1 to 6 carbon atoms (such as trifluoromethoxy group and nonafluorobutoxy group), perfluoroalkyl groups having 1 to 10 carbon atoms, more preferably having 1 to 6 carbon atoms (such as trifluoromethyl group and nonafluorobutyl group), halogen atoms (such as fluorine and chlorine), and a cyano group.

The alkyl group, alkoxy group, alkoxycarbonyl group, acyl group or acyloxy group represented by $T^1$ and $T^2$ in Formula (1) may be substituted or unsubstituted, and the substituent group may be those of the substituent groups V.

The substituent group on the alkyl group, alkoxy group, alkoxycarbonyl group, acyl group and acyloxy group represented by $T^1$ and $T^2$ is preferably a halogen atom (in particular, chlorine or fluorine), a cyano group, a hydroxy group, an alkoxy group or an acyl group, among the substituent groups V.

In the Formula (1), e represents an integer of 1 to 3, preferably 1 or 2. When e is 2 or 3, multiple groups $D^1$ may be the same as or different from each other.

In the Formula (1), m represents an integer of 1 to 3, preferably 1 or 2. When m is 2 or 3, multiple groups $D^1$ may be the same as or different from each other, and multiple groups $L^1$ may be the same as or different from each other.

In the Formula (1), k is 1 or 2. When k is 2, multiple groups $D^2$ may be the same as or different from each other.

In the Formula (1), f represents an integer of 0 to 3, preferably 0 to 2. When f is 2, multiple groups $L^1$ respectively represent different connecting groups.

In the Formula (1), the total number of the groups represented by $D^1$ and $D^2$, i.e., e×m+k, is preferably an integer of 2 to 5, more preferably an integer of 3 to 4. When e and k are respectively 2 or more, two or more groups $D^1$ and $D^2$ may be the same as or different from each other; when f is two or more, two or more groups $L^1$ may be the same as or different from each other; and, when m is two or more, two or more groups $((D^1)_{e(L^1)_f})$ may be the same as or different from each other.

Particularly favorable are the following combinations of e, f, m, and k:

(I) e=1, f=1, m=2, and k=1
(II) e=2, f=1, m=1, and k=1
(III) e=2, f=2, m=1, and k=1
(IV) e=1, f=1, m=1, and k=2
(V) e=1, f=2, m=1, and k=2
(VI) e=2, f=1, m=1, and k=2
(VII) e=1, f=0, m=2, and k=1

Examples of the first and second nematic liquid crystal compounds for use in the invention and their physical property (transition temperature) are listed below, but the invention is not limited thereby. The transition temperature shown below is a value determined by observation on a hot stage manufactured by INSTEC under a polarization microscope.

(First Nematic Liquid Crystal Compounds)

Typical exemplary compounds (1) to (7), (9) and (10)

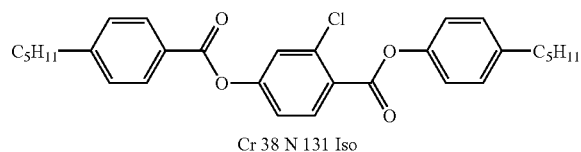

Cr 38 N 131 Iso

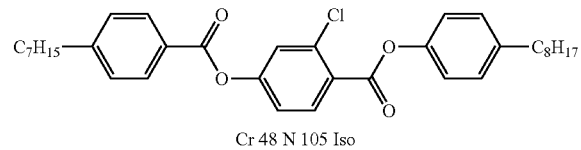

Cr 48 N 105 Iso

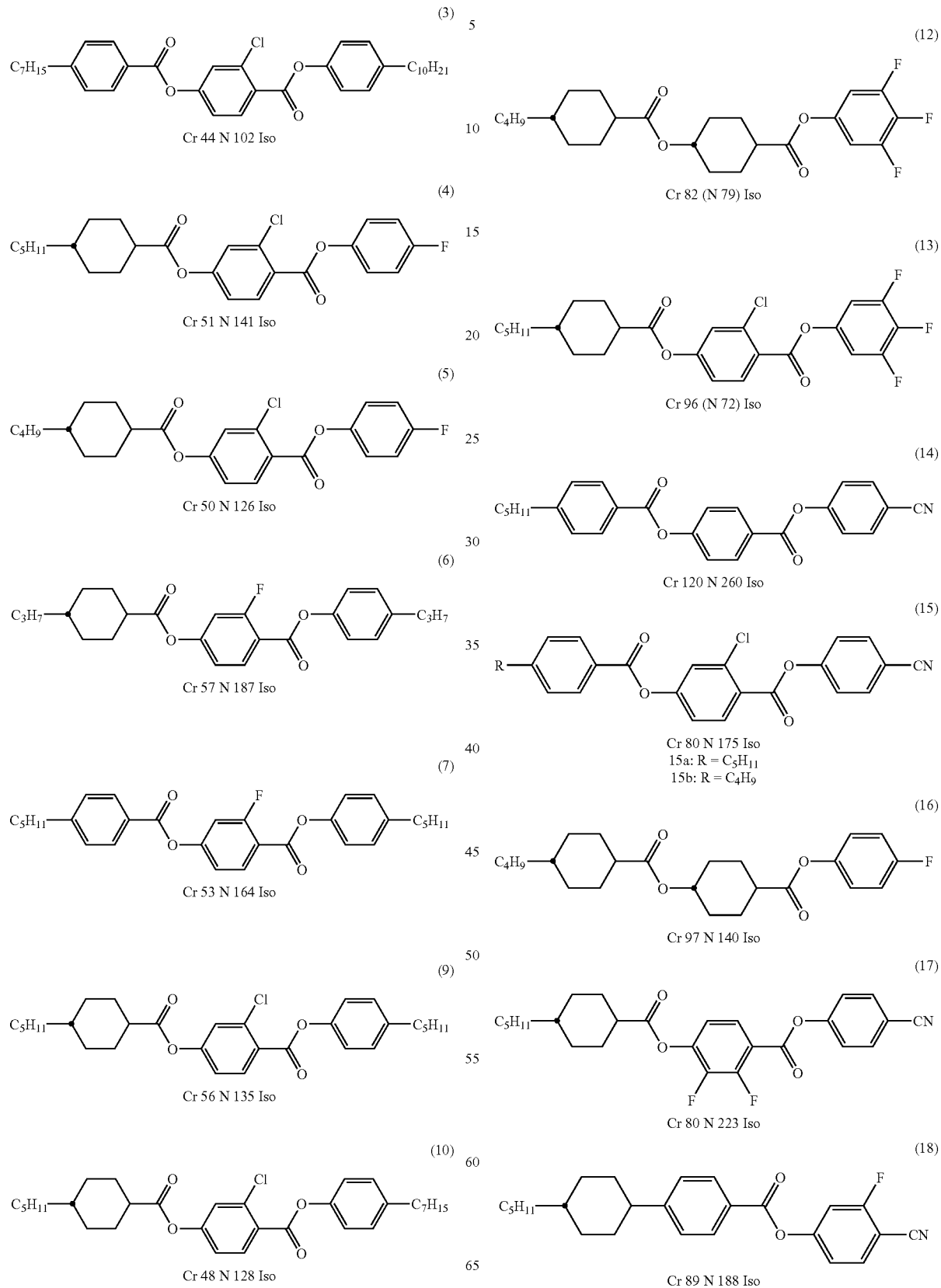

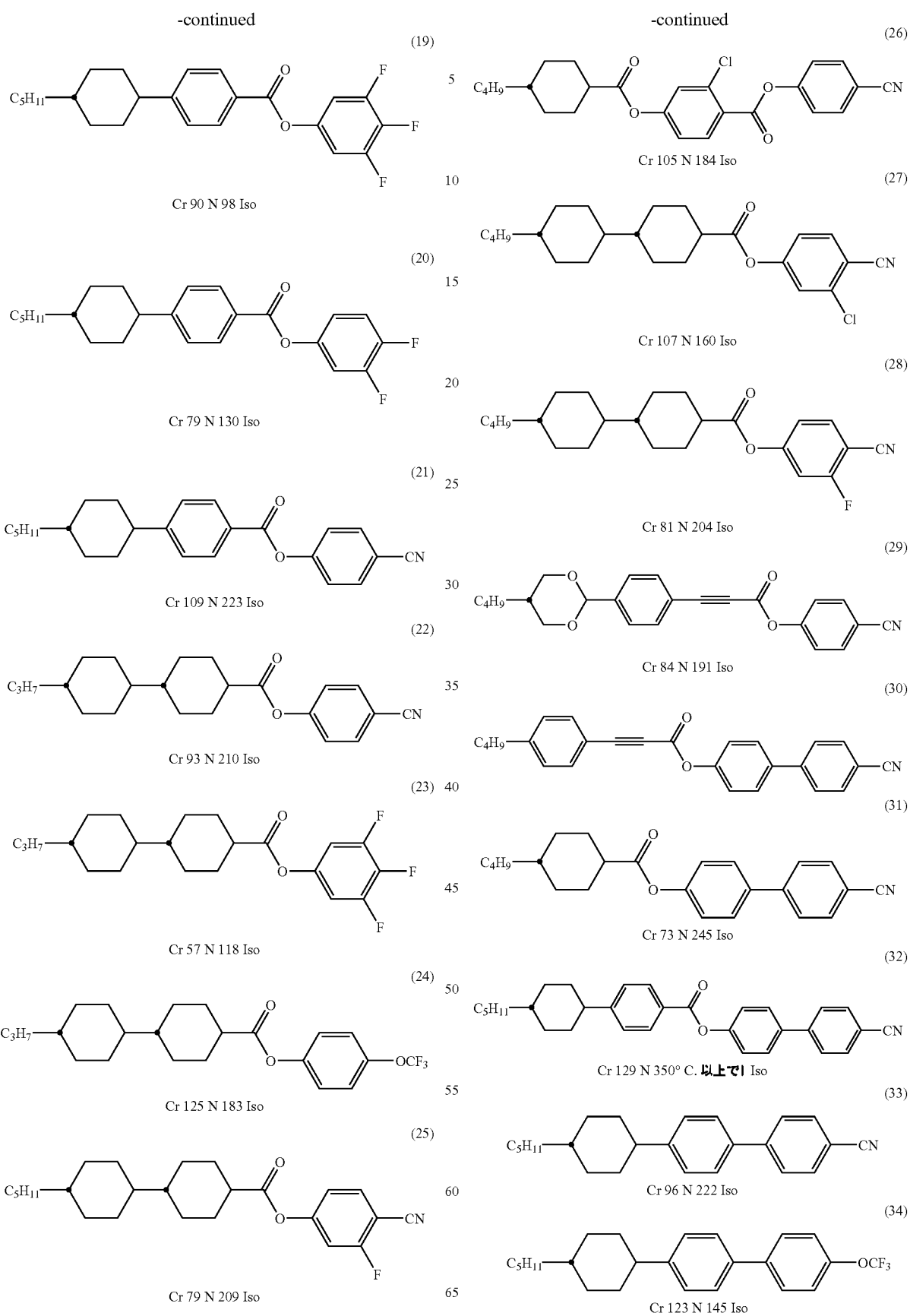

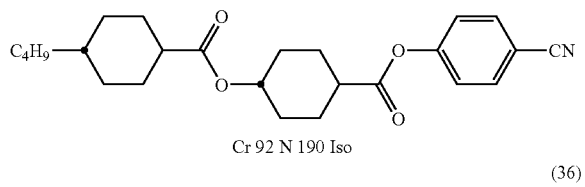

Cr 92 N 190 Iso

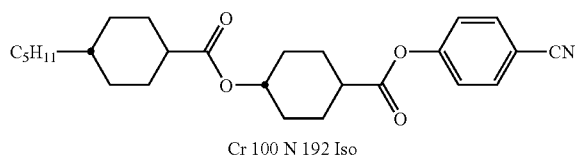

Cr 100 N 192 Iso 1-4. Dual Frequency Addressable Smectic A Liquid Crystal Composition

[1] Smectic A Phase

According to the invention, a smectic A phase is induced when at least a first nematic liquid crystal compound or composition and a second nematic liquid crystal compound or composition are mixed, as described above. In the invention, the "liquid crystal composition in the smectic A phase" refers to a liquid crystal composition forming a smectic A phase at 25° C.

It is possible to determine whether a liquid crystal is a liquid crystal composition in the smectic A phase by placing it on a glass substrate and observing it under a polarization microscope.

The reason for the fact that a smectic A phase is induced by mixing a first nematic liquid crystal compound or composition having a melting point of 60° C. or lower with a polarized group-containing second nematic liquid crystal compound or a composition containing the same is not clear, but the nonpolar or weak-polarizing first nematic liquid crystal compound or composition and the second nematic liquid crystal compound or composition containing a polarized group on the molecule major axis seem to be improved an interaction in the smectic layer by weak donor-acceptor interaction, but the invention is not restricted by the mechanism above.

The ratio of the first nematic liquid crystal compound to the second nematic liquid crystal compound in the dual frequency addressable smectic A liquid crystal composition according to the invention is not particularly limited, as long as the liquid crystal composition obtained by mixing exhibits a smectic A phase and exhibits dual frequency addressing, but the rate of first nematic liquid crystal compound: second nematic liquid crystal compound is preferably 20:80 mol % to 99.9:0.1 mol %, more preferably 40:60 mol % to 99:1 mol %, and particularly preferably 60:40 mol % to 90:10 mol %.

[2] Dual Frequency Addressing

The liquid crystal composition obtained by mixing a first nematic liquid crystal compound or composition with a second nematic liquid crystal compound or composition at least exhibits a smectic A phase as described above and also have dual frequency addressing.

The liquid crystal exhibiting dual frequency addressing in the invention is a liquid crystal that has a dielectric anisotropy $\Delta\in$ reduced by 1 or more when the frequency of the electric field applied to the liquid crystal is raised, for example, from 100 Hz to 1 MHz, and may not have a crossover frequency.

The methods of preparing the liquid crystal composition exhibiting dual frequency addressing and having a crossover frequency by mixing include, but are not limited to, the following methods (1) to (4) of:

(1) mixing a first nematic liquid crystal compound having no crossover frequency with a second nematic liquid crystal compound having no crossover frequency;

(2) mixing a first nematic liquid crystal compound having a crossover frequency with a second nematic liquid crystal compound having no crossover frequency;

(3) mixing a first nematic liquid crystal compound having no crossover frequency with a second nematic liquid crystal compound having a crossover frequency; and (4) mixing a first nematic liquid crystal compound having a crossover frequency with a second nematic liquid crystal compound having a crossover frequency.

Among the methods (1) to (4) above, it is preferable to use the method (4) for making the difference in dielectric property $\Delta\in$ between low- and high-frequency regions larger.

If the dual frequency addressable smectic A liquid crystal induced when a first nematic liquid crystal compound and a second nematic liquid crystal compound are mixed by the above method does not have a crossover frequency, a third liquid crystal component may be added for adjustment. Such methods include the following methods (5) to (8) of:

(5) adding a liquid crystal having negative $\Delta\in$ and exhibiting no dual frequency addressing as the third component when $\Delta\in$ of the induced dual frequency addressable smectic A liquid crystal at 100 Hz is positive;

(6) adding a liquid crystal having positive $\Delta\in$ and exhibiting no dual frequency addressing as the third component when $\Delta\in$ of the induced dual frequency addressable smectic A liquid crystal at 100 Hz is negative;

(7) adding a liquid crystal having a negative $\Delta\in$ and exhibiting dual frequency addressing as the third component when $\Delta\in$ of the induced dual frequency addressable smectic A liquid crystal at 100 Hz is positive; and (8) adding a liquid crystal having positive $\Delta\in$ and exhibiting dual frequency addressing as the third component when $\Delta\in$ of the induced dual frequency addressable smectic A liquid crystal at 100 Hz is negative.

Among the methods (5) to (8) above, it is preferable to use the method (7) for making the difference in dielectric properties $\Delta\in$ between low- and high-frequency ranges larger.

Figure 1B:
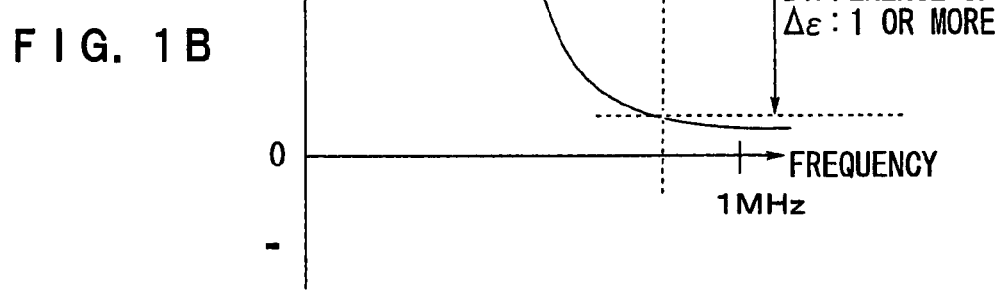
FIG. 1B is a graph showing the dielectric property of another liquid crystal compound or composition for use in the invention.
Figure 1C:
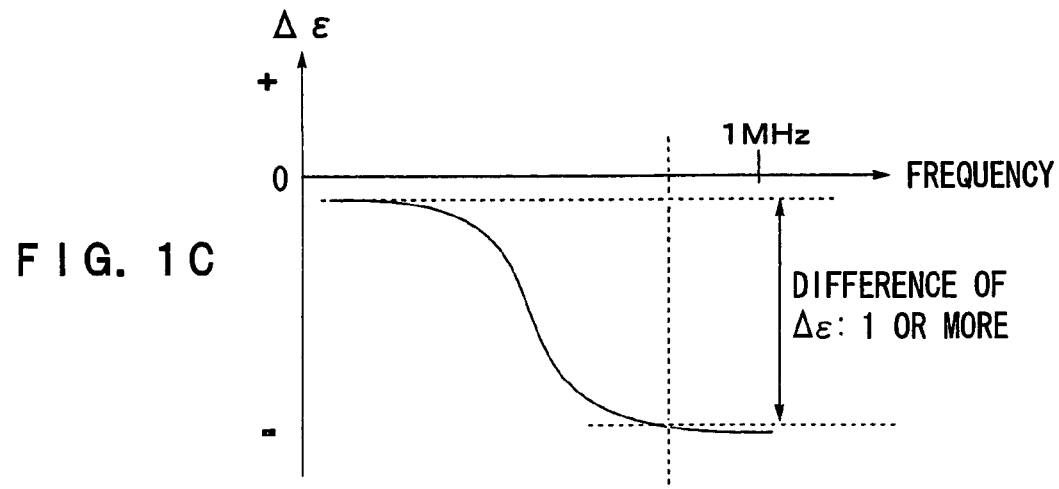
FIG. 1C is a graph showing the dielectric property of yet another liquid crystal compound or composition for use in the invention.

The liquid crystal compound or composition exhibiting dual frequency addressing for use may be a liquid crystal compound having a positive dielectric anisotropy $\Delta\in$ in the low frequency range and having a negative $\Delta\in$ in the high frequency range, as shown in FIG. 1A in a frequency range of 100 Hz to 1 MHz; a compound showing a positive dielectric anisotropy $\Delta\in$ at any frequency in a frequency range of 100 Hz to 1 MHz, as shown in FIG. 1B; or a compound having a negative dielectric anisotropy $\Delta\in$ at any frequency in a frequency range of 100 Hz to 1 MHz, as shown in FIG. 1C.

However, the smectic A liquid crystal composition according to the invention shows a smectic A phase and also dual frequency addressing, and additionally, has a crossover frequency in the range of 1 MHz or less. Thus in preparation of the smectic A liquid crystal composition according to the invention, it is needed to consider the dielectric properties of the liquid crystal compounds or compositions used in combination.

The crossover frequency is a frequency at which the anisotropy in dielectric constant ($\Delta\in$) is 0, and thus, the anisotropy $\Delta\in$ is positive in the lower frequency region and negative in the higher frequency. The crossover frequency is determined by using a commercially available dielectric constant analyzer (Solartron 1255B, 1296, manufactured by Toyo Corporation).

It is possible to change the dielectric anisotropy Δ∈ of a liquid crystal composition having a crossover frequency between positive and negative and to change the orientation direction thereof by using such a property.

For other dual frequency addressable liquid crystals, see Japan Society for the Promotion of Science 142nd Committee Ed., Liquid Crystal Device Handbook, Nikkankogyo Shimbun, 1989, pp. 189 to 192.

Examples of the liquid crystal compounds exhibiting dual frequency addressing include the following dual frequency addressable liquid crystal composition available from Eastman Kodak.

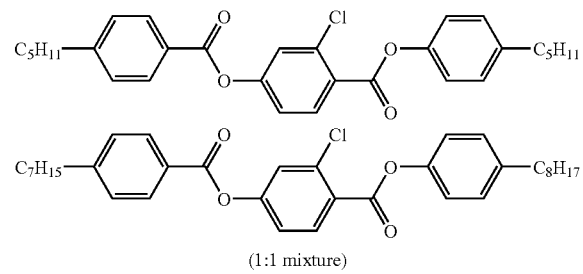

(1:1 mixture)

Other commercially available dual frequency addressable liquid crystal materials include DF-02XX, DF-05XX, FX-1001, and FX-1002 manufactured by Chisso Corporation, MLC-2048 manufactured by Merck, and the like.

It is possible to determine whether a mixed liquid crystal composition obtained by mixing at least a first nematic liquid crystal compound with a second nematic liquid crystal compound exhibits dual frequency addressing and has a crossover frequency, by using a commercially available dielectric analyzer (Solartron 1255B, 1296, manufactured by Toyo Corporation).

Hereinafter, the method of controlling the dielectric property and the frequency characteristics of the dual frequency addressable liquid crystal composition by mixing two or more liquid crystal compounds or compositions will be described in detail.

Generally favorably as the dielectric property of a dual frequency addressable liquid crystal, Δ∈ is more positive in the low frequency range and more negative in the high frequency range. The dual frequency addressable smectic A liquid crystal composition according to the invention is also the same in the preferred dielectric property.

Figure 2:
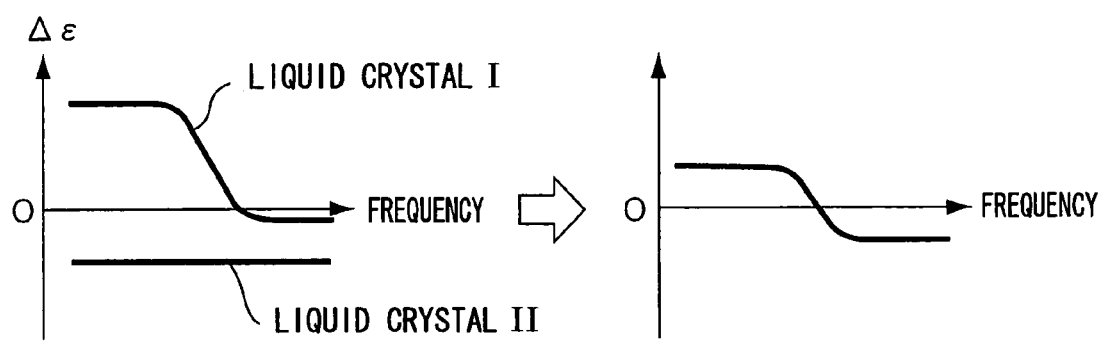
FIG. 2 is a graph showing the dielectric property of a liquid crystal composition obtained in combination of two kinds of liquid crystal compounds or compositions.

As shown in FIG. 2, a liquid crystal having a large negative Δ∈, independently of frequency (liquid crystal II in FIG. 2) is generally added to a dual frequency addressable liquid crystal (liquid crystal I in FIG. 2) having a large positive Δ∈ in the low frequency range, to give such a dielectric property. See for detail in Japan Society for the Promotion of Science 142nd Committee Ed., Liquid Crystal Device Handbook, Nikkankogyo Shimbun, 1989, pp. 189 to 192.

Figure 3:
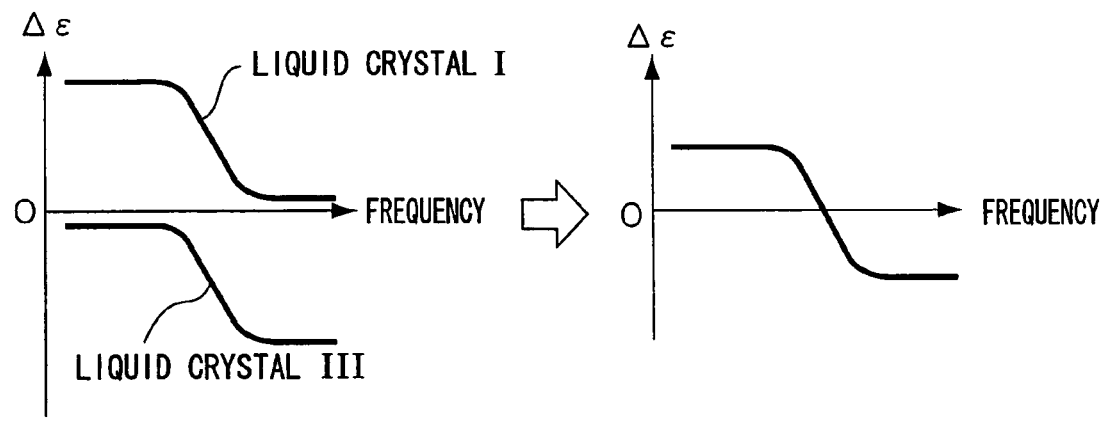
FIG. 3 is a graph showing the dielectric property of another liquid crystal composition obtained in combination of two kinds of liquid crystal compounds or compositions.

However, addition of a liquid crystal having a dielectric anisotropy Δ∈ of a certain negative value independently of the frequency is undesirable, because it leads to decrease of Δ∈ in the low frequency range. Preferably in the invention, as shown in FIG. 3, a liquid crystal compound or composition in which the difference of a dielectric anisotropy Δ∈ between the low-frequency and the high frequency is 6 or more and the dielectric anisotropy Δ∈ at the high frequency is −8 or less (liquid crystal III in FIG. 3) is added, as a third liquid crystal component instead of the liquid crystal II above. Thus as shown in FIG. 3, it is possible to prevent reduction of the difference in dielectric anisotropy Δ∈ between low- and high-frequency ranges, by mixing the liquid crystals I and III. In the invention, it is thus possible to respectively make the values of dielectric anisotropy Δ∈ in the low- and high-frequency ranges more positive and more negative by the method. In the third liquid crystal component, the difference of the dielectric anisotropy Δ∈ between the low-frequency and the high frequency is preferably 8 or more, and more preferably 9 or more. The dielectric anisotropy Δ∈ at the high frequency is preferably −10 or less, and more preferably −12 or less.

The dual frequency addressable smectic A liquid crystal composition according to the invention, which is a liquid crystal having a dielectric anisotropy Δ∈ decreased by 1 or more in the range of 1 MHz or less when the frequency of the electric field applied to the liquid crystal is raised, has a dielectric anisotropy Δ∈ rapidly changing when the frequency is increased. The low frequency range in the invention is a frequency range lower than the frequency at which the dielectric anisotropy Δ∈ begins to change rapidly, as shown in FIGS. 1A, 1B and 1C, and the high frequency range is a range higher than the frequency higher than the frequency range in which the dielectric anisotropy Δ∈ decreases drastically. The frequency at which the dielectric anisotropy Δ∈ begins to drop varies according to the kind of the liquid crystal composition used, and thus, it is difficult to specify the low and high frequency ranges, but, in using dual frequency addressing in a liquid crystal element, the frequency ranges should be practical, and typical low frequency range is preferably 0.1 Hz to 100 kHz, more preferably 1 Hz to 10 kHz, and still more preferably 10 Hz to 5 kHz. Typical high-frequency region is preferably 100 Hz to 10 MHz, more preferably 100 Hz to 1 MHz, and still more preferably 1 kHz to 1 MHz.

The liquid crystal compound added as the third liquid crystal component is not limited to that in the nematic phase, but the entire liquid crystal composition containing the added third liquid crystal component should be a liquid crystal composition in the smectic A phase exhibiting dual frequency addressing. A composition not in the smectic A phase becomes a volatile liquid crystal composition.

The third liquid crystal component preferably contains a polarized group such as a cyano group, a halogen atom, a perfluoroalkoxy group, or a perfluoroalky group on the molecule minor axis so that the value of the dielectric anisotropy Δ∈ becomes more negative as the frequency is increased.

Liquid crystal compounds favorable as the third liquid crystal component will be shown below, but the invention is not limited to these compounds.

(51)

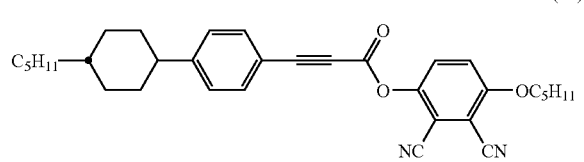

Cr 116 N 124 Iso
Δε (100 Hz) = −13.1
Δε (30 kHz) = −22.5

-continued

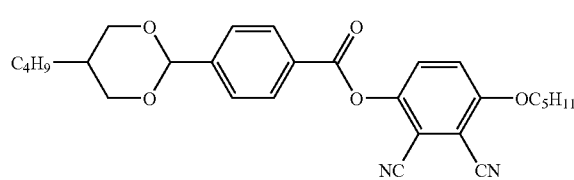

(52)

Cr 154 Iso
Δε (100 Hz) = −7.2
Δε (30 kHz) = −18.6

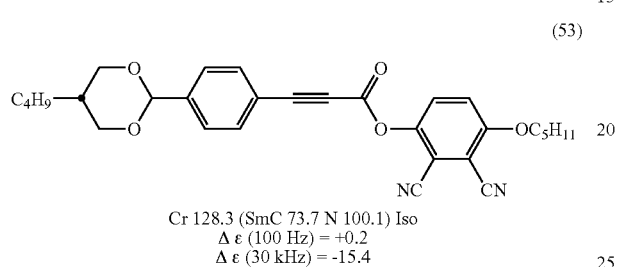

(53)

Cr 128.3 (SmC 73.7 N 100.1) Iso
Δε (100 Hz) = +0.2
Δε (30 kHz) = −15.4

In addition, the dual frequency addressable smectic A liquid crystal composition according to the invention may contain a liquid crystal compound other than the first and second nematic liquid crystal compounds (corresponding to the liquid crystal II shown in FIG. 2), for the purpose of changing the physical properties of the host liquid crystal (such as temperature range of liquid crystalline phase, dielectric anisotropy (Δε) and crossover frequency (threshold frequency)). However, the liquid crystal composition finally obtained by addition of the liquid crystal compound should be in the smectic A phase and exhibit dual frequency addressing.

Hereinafter, liquid crystal additives other than the first and second nematic liquid crystal compounds for use in the smectic A liquid crystal composition according to the invention will be shown, but the invention is not limited to these additives.

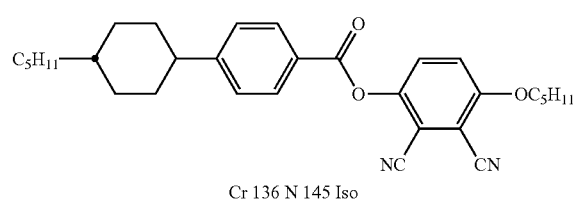

(37)

Cr 136 N 145 Iso

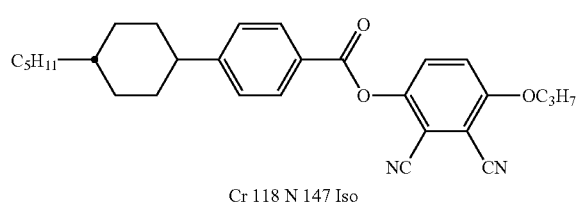

(38)

Cr 118 N 147 Iso

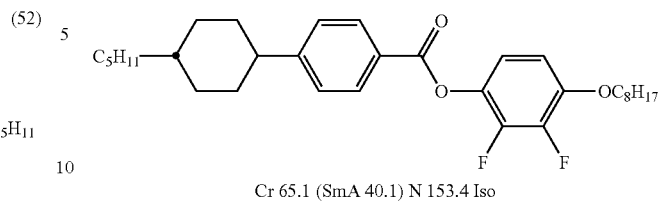

(39)

Cr 65.1 (SmA 40.1) N 153.4 Iso

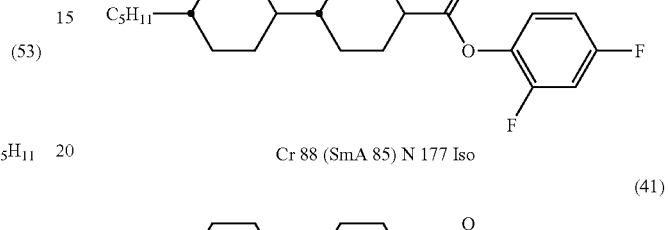

(40)

Cr 88 (SmA 85) N 177 Iso

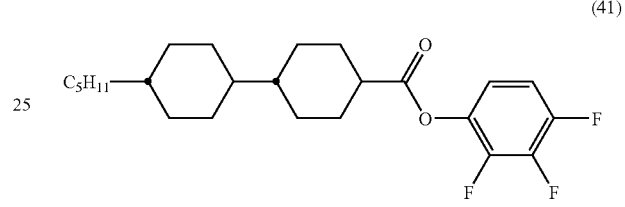

(41)

Cr 83 N 162 Iso

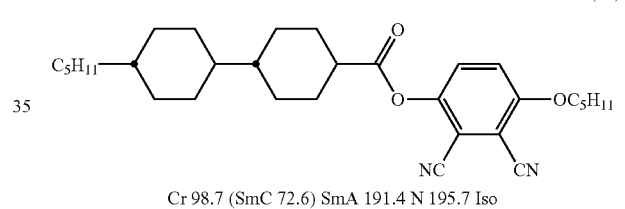

(42)

Cr 98.7 (SmC 72.6) SmA 191.4 N 195.7 Iso

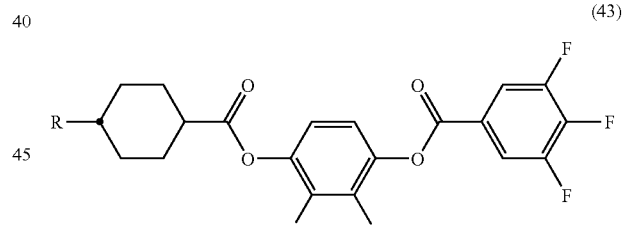

(43)

Cr 97 SmA 185 Iso
43a: R = C5H11
43b: R = C4H9

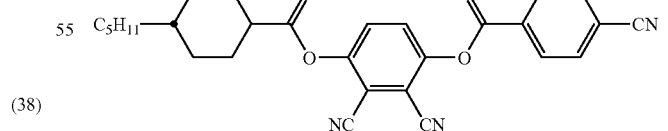

(44)

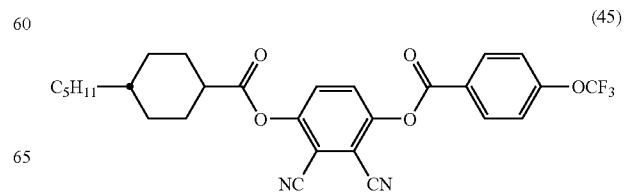

(45)

-continued

Cr 137 N 214 Iso

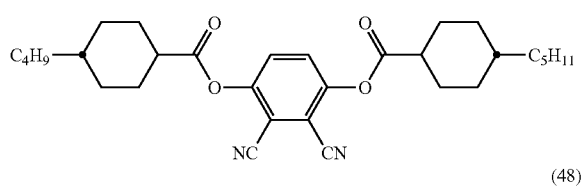

Cr 138 N 210 Iso

Cr 82 SmA 140 N 155 Iso

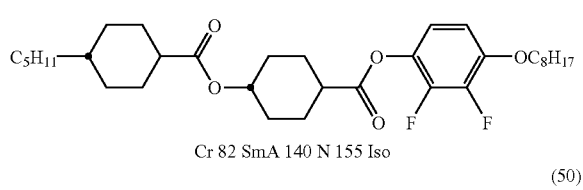

Cr 96 SmA 110 N 185 Iso

The smectic liquid crystal composition according to the invention may contain a nematic liquid crystal compound having a polarity not reversed between low- and high-frequency ranges of the applied electric field.

Typical examples of the nematic liquid crystal compounds above include azomethine compounds, cyanobiphenyl compounds, cyanophenyl esters, fluorine-substituted phenyl esters, phenyl cyclohexanecarboxylate ester, fluorine-substituted phenyl cyclohexanecarboxylate esters, cyanophenylcyclohexane, fluorine-substituted phenylcyclohexanes, cyano-substituted phenylpyrimidines, fluorine-substituted phenylpyrimidines, alkoxy-substituted phenylpyrimidines, fluorine-substituted alkoxy-substituted phenylpyrimidines, phenyldioxane, tolan compounds, fluorine-substituted tolan compounds, alkenylcyclohexylbenzonitriles and the like. Also used favorably are the liquid crystal compounds described in the "Liquid Crystal Device Handbook" (Japan Society for the Promotion of Science 142nd Committee Ed., Nikkankogyo Shimbun, 1989), pp. 154 to 192 and pp. 715 to 722.

Fluorine-substituted host liquid crystals suitable for TFT addressing may also be used. Examples thereof include liquid crystals (ZLI-4,692, MLC-6,267, 6,284, 6,287, 6,288, 6,406, 6,422 6,423, 6,425, 6,435, 6,437, 7,700, 7,800, 9,000, 9,100, 9,200, 9,300, 10000 and others) manufactured by Merck and liquid crystals (LIXON 5036xx, 5037xx, 5039xx, 5040xx, 5041xx, and others) manufactured by Chisso Corporation.

A compound showing no liquid crystallinity may be added to the smectic A liquid crystal composition according to the invention, for modification of the physical properties of the host liquid crystal (such as liquid temperature range of crystalline phase, dielectric anisotropy, refractive-index anisotropy or crossover frequency). In addition, the liquid crystal composition according to the invention may contain various additives such as chiral agent, ultraviolet absorbent, antioxidant, and others. Examples of the additives include chiral agents for TN and STN described in "Liquid Crystal Device Handbook" (Japan Society for the Promotion of Science, 142nd Committee Ed., Nikkankogyo Shimbun, 1989) pp. 199 to 202.

[3] Dichroic dye

In a favorable embodiment, the dual frequency addressable smectic A liquid crystal composition contains a dichroic dye, because the dual frequency addressable smectic A liquid crystal composition according to the invention containing a dichroic dye is a liquid crystal composition allowing color display.

The dichroic dye is defined as a compound which is dissolved in a host liquid crystal and has a function of absorbing light. While the absorption maximum and the absorbing band of the dichroic dye are not particularly restricted, it is preferred that the dye has an absorption maximum in a yellow region (Y), a magenta region (M) or a cyan region (C).

Further, as shown in the displaying method described above, it is also preferred to conduct full color display using dichroic dyes showing absorption in green, red, and blue regions and juxtaposing dual frequency addressable smectic A liquid crystal compositions containing them.

The dichroic dye to be used for each of smectic liquid crystal compositions may be used alone or may be used as a mixture of plurality of them. In a case of mixing a plurality of dyes, dyes having the same species of chromophoric group may be mixed, dichromatic dyes having chromophoric groups which are different from each other may be mixed, and a mixture of dichroic dyes having absorption maximums in Y, M and C is preferably used.

Well known dichroic dyes include, for example, those described in "Diachronic Dyes for Liquid Crystal Display", written by A. V. Ivashchenko, 1994, published from CRC Corp. A method of conducting full color display by mixing a yellow dye, a magenta dye, and a cyan dye is described in details in "Color Chemistry", (written by Sumio Tokida, 1982, published from Maruzen). The yellow region herein is a range of 430 to 490 nm, the magenta region is a range of 500 to 580 nm, and the cyan region is a range of 600 to 700 nm.

Next, the chromophoric group used in the dichroic dye of the present invention will be explained.

Any chromophoric group of the dichroic dye may be used, including, for example, azo dyes, anthraquinone dyes, perylene dyes, merocyanine dyes, azomethine dyes, phthaloperylene dyes, indigo dyes, azulene dyes, dioxadine dyes, polythiophene dyes, and phenoxadine dyes. Preferred are azo dyes, anthraquinone dies, phenoxazine dyes, and particularly preferred are anthraquinone dyes, and phenoxazone dyes (phenoxazine-3-one).

The azo dyes may be any of monoazo dyes, bisazo dyes, trisazo dyes, tetrakisazo dyes, and pentakisazo dyes, and preferred are monoazo dyes, bisazo dyes, trisazo dyes and the like.

The cyclic structure contained in the azo dye may be heterocyclic rings (quinoline ring, pyridine ring, thiazole ring, benzothiazole ring, oxazole ring, benzooxazole ring, imidazole ring, benzoimidazole ring, pyrimidine ring, etc.) in addition to aromatic groups (benzene ring, naphthalene ring, etc.).

The substituent for the anthraquinone dye is preferably those containing an oxygen atom, sulfur atom, or nitrogen atom and includes, for example, an alkoxy group, an aryloxy group, an alkylthio group, an arylthio group, an alkylamino group, and an arylamino group. The number of substitution of the substituent may be of any number and di-substitution, tri-substitution, or tetrakis-substitution is preferred, and di-substitution and tri-substitution are particularly preferred. The substitution of the substituent may be at any position and preferred structure is 1,4-di-substitution, 1,5-di-substitution, 1,4,5-tri-substitution, 1,2,4-tri-substitution, 1,2,5-tri-substitution, 1,2,4,5-tetra-substitution, and 1,2,5,6-tetra-substitution.

The substituent for the phenoxazone dye (phenoxazin-3-one) is preferably those containing an oxygen atom, sulfur atom, or nitrogen atom and includes, for example, an alkoxy group, an aryloxy group, an alkylthio group, an arylthio group, an alkylamino group, and an arylamino group.

The dichroic dye according to the present invention preferably has the substituent represented by the following Formula (2).

$-(Het)_j-\{(B^1)_p-(Q^1)_q-(B^2)_r\}_n-C^1$  Formula (2):

In the Formula (2), Het represents oxygen atom or sulfur atom, and particularly preferably sulfur atom.

In the Formula (2), $B^1$ and $B^2$ each represents independently an arylene group, a hetero-arylene group, or a bivalent cycloaliphatic hydrocarbon group each of which may or may not have a substituent.

The arylene group represented by $B^1$ and $B^2$ is preferably an arylene group having 6 to 20 carbon atoms, more preferably 6 to 10 carbon atoms. Specific examples of preferred arylene group include, for example, phenylene group, naphthalene group, and anthracene group, particularly preferably a substituted phenylen group, and further preferably 1,4-phenylene group.

The heteroarylene group represented by $B^1$ and $B^2$ is preferably an heteroarylene group having 1 to 20 carbon atoms, and more preferably an heteroarylene group having 2 to 9 carbon atoms. Specific examples of preferred heteroarylene group include, for example, a group comprising pyridine ring, quinoline ring, isoquinoline ring, pyrimidine ring, pyrazine ring, thiophene ring, furan ring, oxazole ring, thiazole ring, imidazole ring, pyrazole ring, oxadiazole ring, thiadiazole ring, and triazole ring, as well as a heteroarylene group obtained by eliminating hydrogen atoms each by one from two carbon atoms in a condensed ring formed by ring condensation thereof.

The bivalent cycloaliphatic hydrocarbon group represented by $B^1$ and $B^2$ is preferably a bivalent cycloaliphatic hydrocarbon group having, preferably 3 to 20 carbon atoms, more preferably 4 to 10 carbon atoms. Specific examples of preferred bivalent cycloaliphatic hydrocarbon group include a cyclohexanediyl and cyclopentanediyl, more preferably cyclohexane-1,2-diyl, cyclohexane-1,3-diyl, cyclohexane-1,4-diyl, and cyclopentane-1,3-diyl, particularly preferably (E)-cyclohexane-1,4-diyl.

The bivalent arylene group, the bivalent heteroarylene group, and the bivalent cycloaliphatic hydrocarbon group represented by $B^1$ and $B^2$ may further have a substituent and the substituent includes the substituent group V described previously.

Among the substituent groups V, preferred substituent for the bivalent arylene group, bivalent heteroarylene group, and bivalent cyclic hydrocarbon group are the above mentioned alkyl group, aryl group, alkoxy group, aryloxy group, halogen atom, amino group, substituted amino group, hydroxy group, alkylthio group, and arylthio group, and more preferably alkyl group, aryl group, and halogen atom.

$Q^1$ in the Formula (2) represents a bivalent linking group, which is a linking group having an atomic group comprising at least one atom selected from carbon atom, nitrogen atom, sulfur atom, and oxygen atom.

The bivalent linking group represented by $Q^1$ is a bivalent linking group having preferably 0 to 60 carbon atoms, more preferably 0 to 30 carbon atoms, and further preferably 0 to 20 carbon atoms.

Further, the bivalent linking group represented by $Q^1$ preferably includes bivalent linking groups comprising an alkylene group, an alkenylene group, an alkynilene group, an amide group, an ether group, an ester group, a sulfoneamide group, an ureido group, a sulfonyl group, a sulfinyl group, a thioether group, a carbonyl group, an —NR— group (in which R represents hydrogen atom, an alkyl group or an aryl group), an azo group, an azoxy group, a heterocyclic bivalent group each by one or as a combination of two or more of them.

The alkylene group represented by $Q^1$ is an alkylene group having preferably 1 to 20 carbon atoms, more preferably 1 to 10 carbon atoms, and includes, for example, a methylene group, an ethylene group, a propylene group, a butylene group, a pentylene group, and a cyclohexyl-1,4-diyl group.

The alkenylene group represented by $Q^1$ is preferably an alkenylene group having preferably 2 to 20 carbon atoms, more preferably 2 to 10 carbon atoms, and includes, for example, an ethenylene group.

The alkynylene group represented by $Q^1$ is an alkynylene group having, preferably 2 to 20 carbon atoms, more preferably 2 to 10 carbon atoms, and includes, for example, an ethynylene group.

The alkyl group represented by R in the —NR— group is an alkyl group having preferably 1 to 20 carbon atom, more preferably 1 to 10 carbon atoms, and the aryl group represented by R is an aryl group having, preferably 6 to 14 carbon atoms, more preferably 6 to 10 carbon atoms.

The heterocyclic ring represented by $Q^1$ is a heterocyclic ring of, preferably 2 to 20 carbon atoms, more preferably 4 to 10 carbon atoms, and includes, for example, a piperazine-1,4-diyl group.

The bivalent linking group represented by $Q^1$ is preferably an alkylene group, an alkenylene group, an alkynylene group, an ether group, a thioether group, an amido group, an ester group, a carbonyl group, and their combinations.

The bivalent linking group represented by $Q^1$ is particularly preferably an alkylene group, an alkynylene group, an ether group, an amido group, an ester group, and a carbonyl group.

$C^1$ in the Formula (2) represents an alkyl group, a cycloalkyl group, an alkoxy group, an alkoxycarbonyl group, an acyl group, and an acyloxy group.

$C^1$ is preferably an alkyl group or a cycloalkyl group having 1 to 30 carbon atoms, preferably 1 to 12 carbon atoms, more preferably from 1 to 8 carbon atoms, an alkoxy group having 1 to 20 carbon atoms, preferably 1 to 10 carbon atoms, more preferably 1 to 8 carbon atoms, an acyloxy group having 1 to 20 carbon atoms, preferably 2 to 12 carbon atoms, more preferably 2 to 8 carbon atoms, an acyl group having 1 to 30 carbon atoms, preferably 1 to 12 carbon atoms, more preferably 1 to 8 carbon atoms, and an alkoxycarbonyl group having 2 to 20 carbon atoms, preferably 2 to 12 carbon atoms, more preferably 2 to 8 carbon atoms.

The alkyl group, cycloalkyl group, alkoxy group, alkoxycarbonyl group, acyl group and acyloxy group represented by $C^1$ may have or may not have a substituent, and the substituent includes, for example, the substituent group V described above.

A substituent for the alkyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the cycloalkyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, an aryloxycarbonyl group, and an alkyl group.

A substituent for the alkoxy group represented by $C^1$ preferably includes, among the substituent group V, a halogen atom (particularly, fluorine atom), a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the alkoxycarbonyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the acyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group and an aryloxycarbonyl group.

A substituent for the acyloxy group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

Specific examples of the alkyl group and the cycloalkyl group represented by $C^1$ include, for example, methyl, ethyl, propyl, butyl, t-butyl, i-butyl, s-butyl, pentyl, t-pentyl, hexyl, heptyl, octyl, cyclohexyl, 4-methylcyclohexyl, 4-ethylcyclohexyl, 4-propylcyclohexyl, 4-butylcyclohexyl, 4-pentylcyclohexyl, hydroxymethyl, trifluoromethyl and benzyl.

Specific examples of the alkoxy group represented by $C^1$ include, for example, a methoxy group, an ethoxy group, a 2-methoxyethoxy group, or a 2-phenylethoxy group.

Specific examples of the acyloxy group represented by $C^1$ include, for example, an acetyloxy group, and a benzoyloxy group.

Specific examples of the acyl group represented by $C^1$ include, for example, acetyl, formyl, pivaloyl, 2-chloroacetyl, stearoyl, benzoyl, and p-n-octyloxyphenylcarbonyl.

Specific examples of the alkoxycarbonyl group represented by $C^1$ include, for example, methoxycarbonyl, ethoxycarbonyl, and 2-benzyloxycarbonyl.

$C^1$ represents particularly preferably an alkyl group or an alkoxy group, and more preferably ethyl, propyl, butyl, pentyl, hexyl, or trifluoromethoxy.

j represents 0 or 1, and preferably 0.

p, q and r each independently represents an integer of from 0 to 5, and n represents an integer of from 1 to 3. The total number of the groups represented by $B^1$ and $B^2$, that is, $(p+r) \times n$ is an integer of from 3 to 10, more preferably an integer of from 3 to 5. In a case where p, q, or r is 2 or greater, two or more $B^1$, $Q^1$ and $B^2$ may be identical or different with each other respectively, and in a case where n is 2 or greater, $\{(B^1)_p\text{-}(Q^1)_q\text{-}(B^2)_r\}$ may be identical or different with each other.

Preferable combinations of p, q, r, and n are to be described below.

(i) p=3, q=0, r=0, n=1
(ii) p=4, q=0, r=0, n=1
(iii) p=5, q=0, r=0, n=1
(iv) p=2, q=0, r=1, n=1
(v) p=2, q=1, r=1, n=1
(vi) p=1, q=1, r=2, n=1
(vii) p=3, q=1, r=1, n=1
(viii) p=2, q=0, r=2, n=1
(ix) p=1, q=1, r=1, n=2
(x) p=2, q=1, r=1, n=2

An particularly preferred combinations are: (i) p=3, q=0, r=0, n=1, (iv) p=2, q=0, r=1, n=1, or (v) p=2, q=1, r=1, n=1.

Further, the $\text{-}\{(B^1)_p\text{-}(Q^1)_q\text{-}(B^2)_r\}_n\text{-}C^1$ preferably contains a structure showing liquid crystallinity. While the liquid crystal referred to herein may be in any phase, it is preferably nematic liquid crystal, smectic liquid crystal, discotic liquid crystal, and particularly preferably nematic crystal or smectic liquid crystal.

Specific examples of the $\text{-}\{(B^1)_p\text{-}(Q^1)_q\text{-}(B^2)_r\}_n\text{-}C^1$ are shown below, but the present invention is no way limited to the examples (in the following chemical formulae, the wave line represents a connection position).

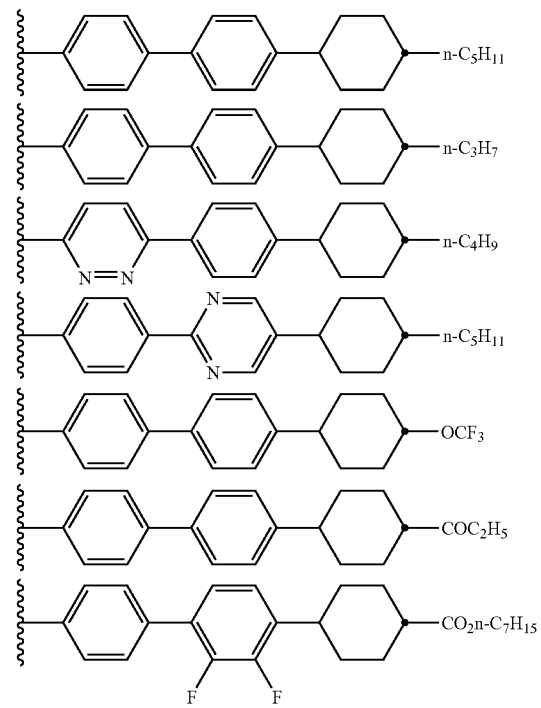

-continued

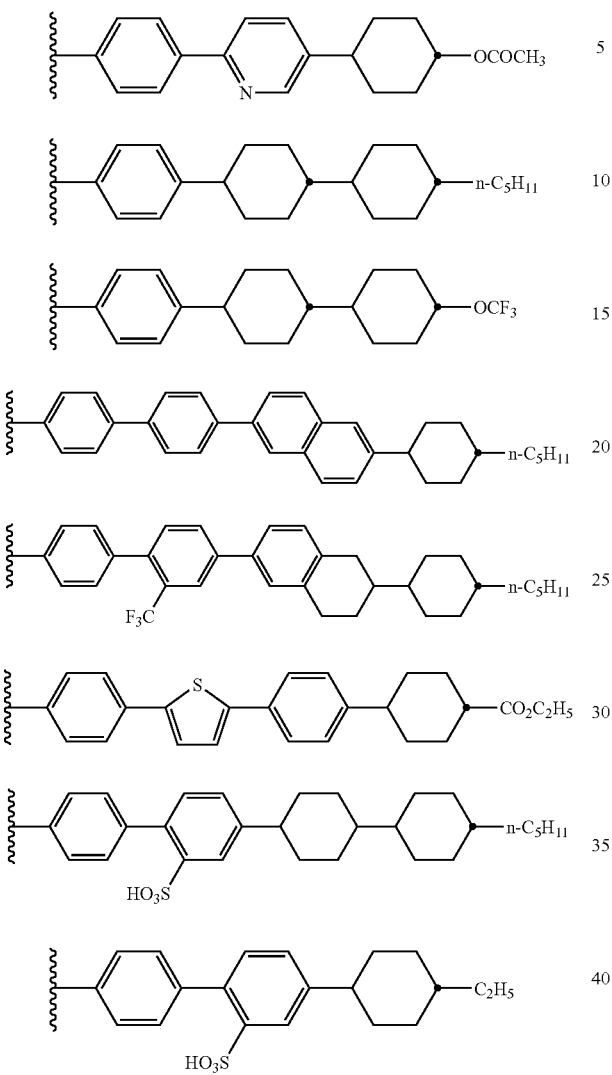

The dichroic dye used in the present invention has preferably one or more, more preferably 1 to 8, further preferably 1 to 4, and particularly preferably 1 to 2 substituents represented by $-\{(B^1)_p\text{-}(Q^1)_q\text{-}(B^2)_r\}_n\text{-}C^1$.

A preferred structure of the substituent represented by the Formula (2) includes combinations described below.

[1] A structure in which Het represents sulfur atom, $B^1$ represents an aryl group or a heteroaryl group, $B^2$ represents cyclohexane-1,4-diyl group, $C^1$ represents an alkyl group, and j=1, p=2, q=0, r=1, and n=1.

[2] A structure in which Het represents sulfur atom, $B^1$ represents an aryl group or a heteroaryl group, $B^2$ represents cyclohexane-1,4-diyl group, $C^1$ represents an alkyl group, and j=1, p=1, q=0, r=2 and n=1.

Especially preferred structures are:

[1] a structure represented by the following Formula (a-1), in which Het represents sulfur atom, $B^1$ represents 1,4-phenylene group, $B^2$ represents trans-cyclohexyl group, $C^1$ represents an alkyl group (preferably, methyl, ethyl, propyl, butyl, pentyl, or hexyl), and j=1, p=2, q=0, r=1 and n=1, and

[2] a structure represented by the following Formula (a-2), in which Het represents a sulfur atom, $B^1$ represents 1,4-phenylene group, $B^2$ represents trans-cylohexane-1,4-diyl, $C^1$ represents an alkyl group (preferably, methyl, ethyl, propyl, butyl, pentyl, or hexyl), and j=1, p=1, q=0, r=2 and n=1.

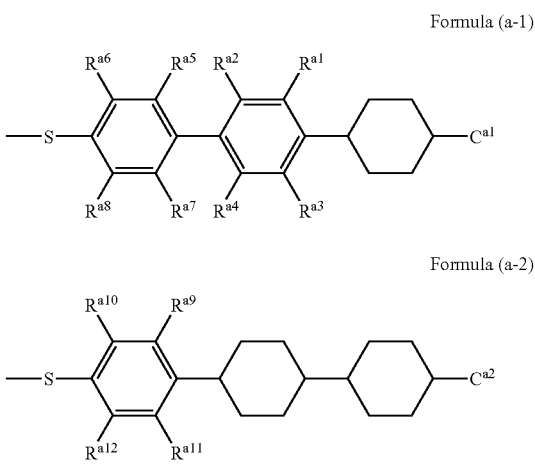

In the Formulae (a-1) and (a-2), $R^{a1}$ to $R^{a12}$ each independently represents a hydrogen atom or a substituent. The substituent includes, for example, a substituent selected from the substituent group V. $R^{a1}$ to $R^{a12}$ each independently represents preferably hydrogen atom, a halogen atom (particularly, fluorine atom), an alkyl group, an aryl group, and an alkoxy group. Among the alkyl group, aryl group, and alkoxy group represented by $R^{a1}$ to $R^{a12}$, preferred are those identical with the alkyl group, aryl group, and alkoxy group described for the substituent group V.

In the Formulae (a-1) and (a-2), $C^{a1}$ and $C^{a2}$ each independently represents an alkyl group, and an alkyl group having preferably 1 to 20 carbon atoms, more preferably 1 to 10 carbon atoms, and particularly preferably methyl, ethyl, propyl, butyl, pentyl, or hexyl.

The azo dye may be any of monoazo dye, bisazo dye, trisazo dye, tetrakisazo dye, or pentakisazo dye, and preferably a monoazo dye, bisazo dye and trisazo dye.

A ring structure contained in the azo dye includes, in addition to aromatic groups (benzene ring, naphthalene ring, etc.), hetero rings (quinoline ring, pyridine ring, thiazole ring, benzothiazole ring, oxazole ring, benzoxazole ring, imidazole ring, benzoimidazole ring, pyrimidine ring, etc.).

The substituent for the anthraquione dye preferably includes those containing an oxygen atom, sulfur atom or nitrogen atom, for example, an alkoxy group, an aryloxy group, an alkylthio group, an arylthio group, an alkylamino group, and an arylamino group.

While the number of substitution for the substituent may be of any number, and di-substitution, tri-substitution, and tetra-substitution are preferred, and di-substitution, tri-substitution are particularly preferred. The substitution of the substituent may be at any position adopted, but preferred are 1,4-di-substitution, 1,5-di-substitution, 1,4,5-tri-substitution, 1,2,4-tri-substitution, 1,2,5-tri-substitution, 1,2,4,5-tetra-substitution, and 1,2,5,6-tetra-substitution structure.

The anthraquinone dye is more preferably a compound represented by the following Formula (3).

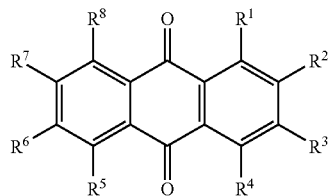

Formula (3)

In the Formula (3), at least one of $R^1$, $R^2$, $R^3$, $R^4$, $R^5$, $R^6$, $R^7$ and $R^8$ represents -(Het)$_j$-{(B$^1$)$_p$-(Q$^1$)$_q$-(B$^2$)$_r$}$_n$-C$^1$, and others each independently represents a hydrogen atom or a substituent.

In the -(Het)$_j$-{(B$^1$)$_p$-(Q$^1$)$_q$-(B$^2$)$_r$}$_n$-C$^1$, Het represents an oxygen atom or a sulfur atom, B$^1$ and B$^2$ each independently represents an arylene group, a heteroarylene group, or a bivalent alicyclic hydrocarbon group, Q$^1$ represents a bivalent linking group, C$^1$ represents an alkyl group, a cycloalkyl group, an alkoxy group, an alkoxycarbonyl group, an acyl group, or an acyloxy group, j represents 0 or 1, p, q and r each independently represents an integer of 0 to 5, and n represents an integer of 1 to 3. The total number of the groups represented by B, and B$^2$, that is, (p+r)×n is an integer of 3 to 10, preferably an integer of 3 to 5; when p is 2 or larger, two or more groups represented by B$^1$ may be the same or different; when q is 2 or larger, two or more groups represented by Q$^1$ may be the same or different; when r is 2 or larger, two or more groups represented by B$^2$ may be the same or different; and when n is 2 or larger, two or more groups represented by {(B$^1$)$_p$-(Q$^1$)$_q$-(B$^2$)$_r$} may be the same or different.

A preferred range for Het, B$^1$, B$^2$, Q$^1$, C$^1$, j, p, q, r and n herein is the same as the preferred range for Het, B$^1$, B$^2$, Q$^1$, C$^1$, j, p, q, r and n as described for the Formula (2) respectively.

The substituent in the Formula (3) is, for example, the substituent group V, and preferably includes a halogen atom, a mercapto group, a hydroxy group, a carbamoyl group, a sulfamoyl group, a nitro group, an alkoxy group, an aryloxy group, an acyloxy group, an acylamino group, an amino group, an alkylthio group, an arylthio group, a heteroarylthio group, an alkoxycarbonyl group, an aryloxycarbonyl group, an alkyl group, an aryl group, and a heteroaryl group, and more preferably a halogen atom, a hydroxy group, a nitro group, an alkoxy group, an aryloxy group, an acyloxy group, an amino group, an alkylthio group, an arylthio group, a heteroarylthio group, an alkoxycarbonyl group, an aryloxycarbonyl group, an alkyl group, an aryl group, and a heteroaryl group.

Further, it is more preferred, at least one of $R^1$, $R^4$, $R^5$ and $R^8$ represents -(Het)$_j$-{(B$^1$)$_p$-(Q$^1$)$_q$-(B$^2$)$_r$}$_n$-C$^1$ in the Formula (3)

The substituent for the phenoxazone dye (phenoxazine-3-one) is preferably those containing oxygen atom, sulfur atom, or nitrogen atom, and preferred examples include an alkoxy group, an aryloxy group, an alkylthio group, an arylthio group, an alkylamino group, and an arylamino group.

The phenoxazone dye is more preferably a compound represented by the following Formula (4).

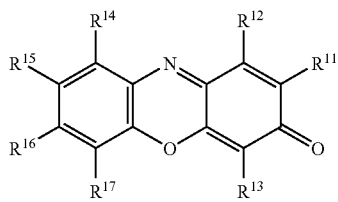

Formula (4)

In the Formula (4), at least one or more of $R^{11}$, $R^{12}$, $R^{13}$, $R^{14}$, $R^{15}$, $R^{16}$, and $R^{17}$ represent -(Het)$_j$-{(B$^1$)$_p$-(Q$^1$)$_q$-(B$^2$)$_r$}$_n$-C$^1$, and others represent hydrogen atom or a substituent, respectively.

In the -(Het)$_j$-{(B$^1$)$_p$-(Q$^1$)$_q$-(B$^2$)$_r$}$_n$-C$^1$, Het represents oxygen atom or sulfur atom, B$^1$ and B$^2$ each independently represents an arylene group, a heteroarylene group or a bivalent alicyclic hydrocarbon group, Q$^1$ represents a bivalent linking group, C$^1$ represents an alkyl group, a cycloalkyl group, an alkoxy group, an alkoxycarbonyl group, an acyl group, and an acyloxy group, j represents 0 or 1, p, q, and r each independently represents an integer of from 0 to 5, n represents an integer of from 1 to 3. The total number of the groups represented by B$^1$ and B$^2$, that is, (p+r)×n is an integer of 3 to 10; preferably an integer of 3 to 5, when p is 2 or larger, two or more groups represented by B$^1$ may be the same or different; when q is 2 or larger, two or more groups represented by Q$^1$ may be the same or different; when r is 2 or larger, two or more groups represented by B$^2$ may be the same or different; and when n is 2 or larger, two or more groups represented by {(B$^1$)$_p$-(Q$^1$)$_q$-(B$^2$)$_r$} may be the same or different.

The preferred ranges for Het, B$^1$, B$^2$, Q$^1$, C$^1$, j, p, q, r and n in this case are the same as the preferred ranges for Het, B$^1$, B$^2$, Q$^1$, C$^1$, j, p, q, r, and n as described for the Formula (2) respectively.

The substituent in the Formula (4) is, for example, the substituent group V, and includes preferably an amino group, a halogen atom, a hydroxy group, an cyano group, an carbamoyl group, a sulfamoyl group, an alkoxy group, an aryloxy group, an acyloxy group, an acylamino group, an ureido group, an imido group, an alkylthio group, an arylthio group, a heteroarylthio group, an alkoxycarbonyl group, an aryloxycarbonyl group, an alkyl group, an aryl group, a heteroaryl group, and more preferably an amino group, a halogen atom, a hydroxy group, a carbamoyl group, an acyloxy group, an acylamino group, an imido group, an alkylthio group, an arylthio group, a heteroarylthio group, an alkoxycarbonyl group, an aryloxycarbonyl group, an alkyl group, and an aryl group.

Further preferably, in the Formula (4), at least one of $R^{11}$, $R^{14}$, and $R^{16}$ represents -(Het)$_j$-{(B$^1$)$_p$-(Q$^1$)$_q$-(B$^2$)$_r$}$_n$-C$^1$.

Specific examples of the dichroic dyes of anthraquinone dye and/or phenoxazone dye usable in the present invention are shown below, but the present invention is no way limited at all by the specific examples below.

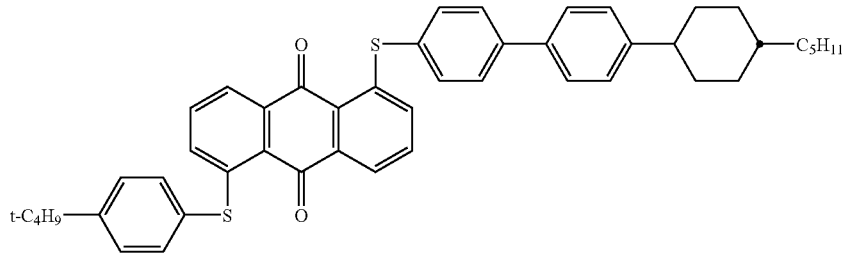
No.1-1
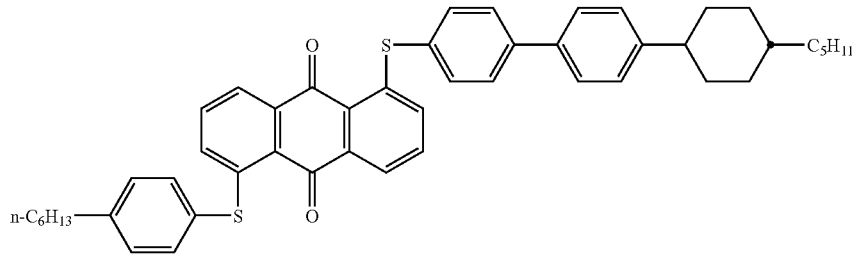
No.1-2
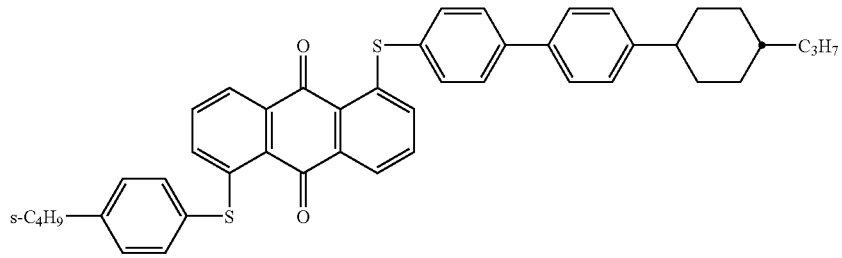
No.1-3
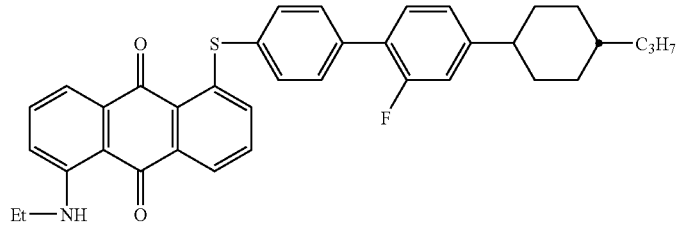
No.1-4
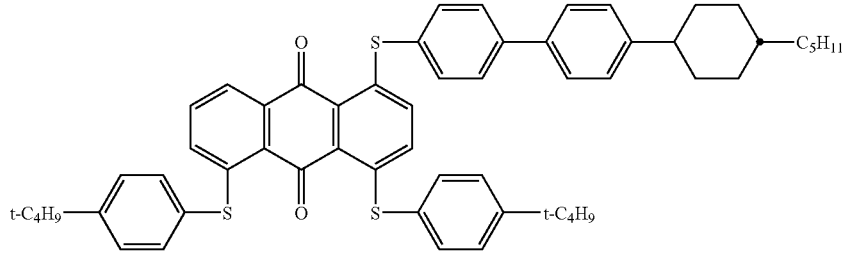
No.1.5
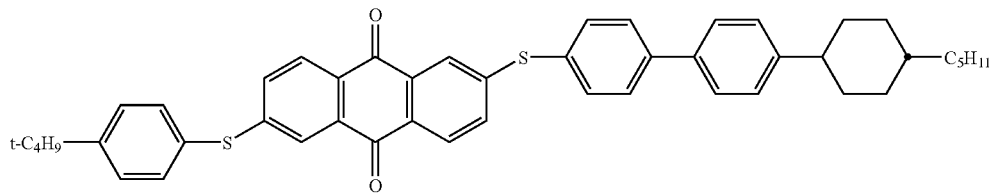
No.1-6

-continued
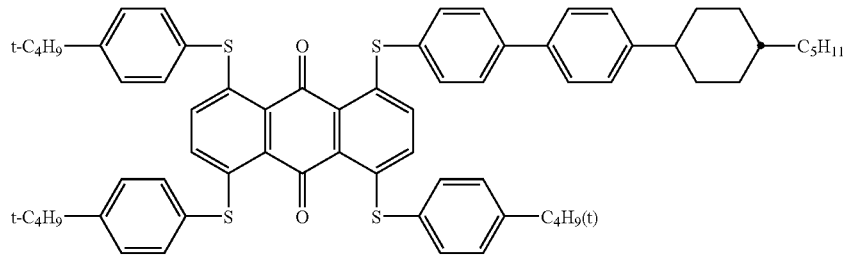
No.1-7
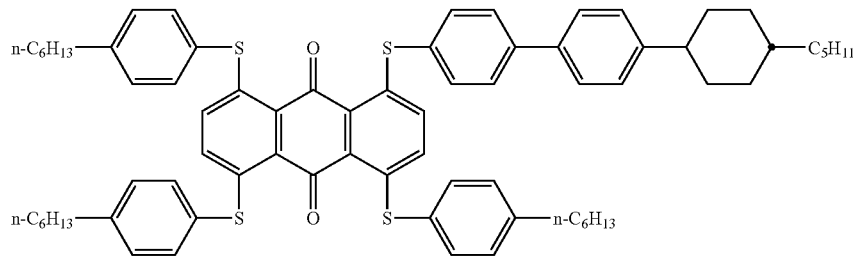
No.1-8
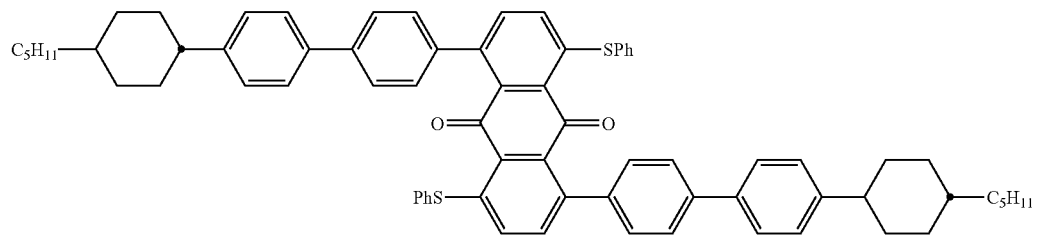
No.1-9
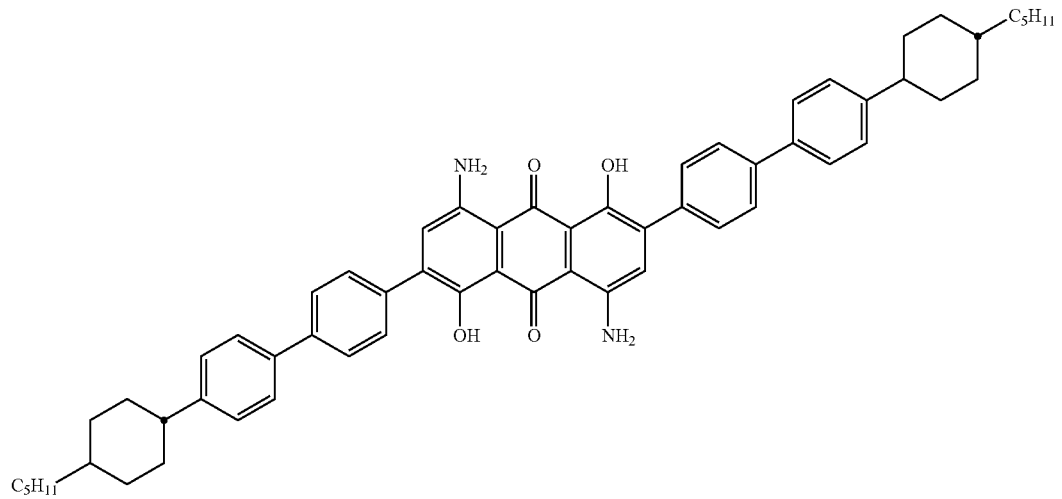
No.1-10
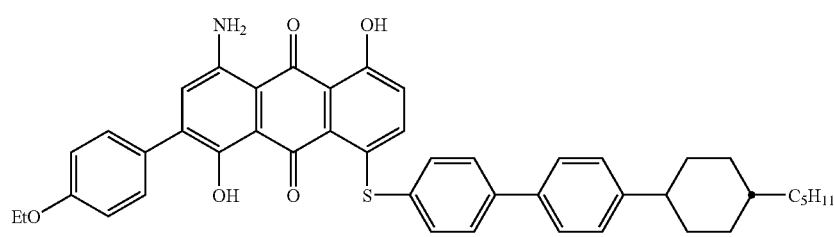
No.1-11

-continued
No.1-12
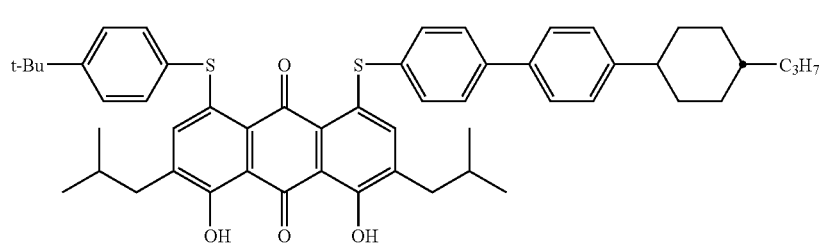
No.1-13
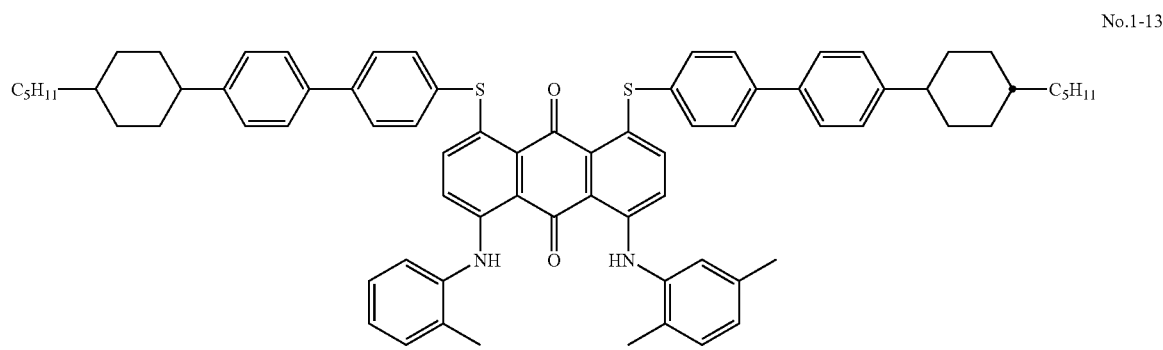
No.1-14
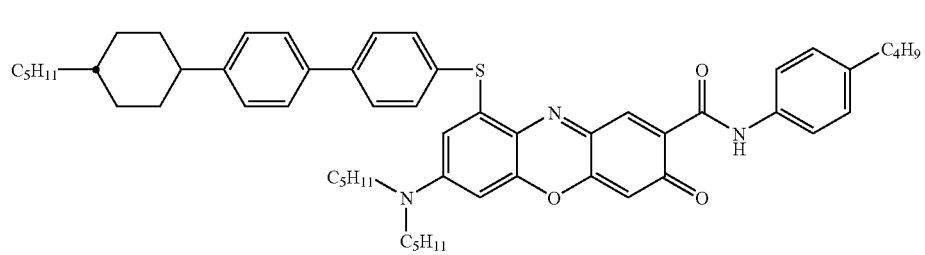
No.1-15
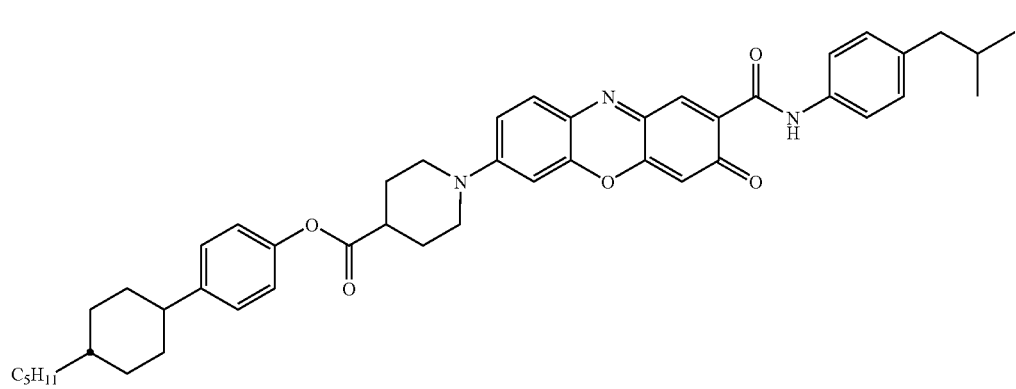
No.1-16
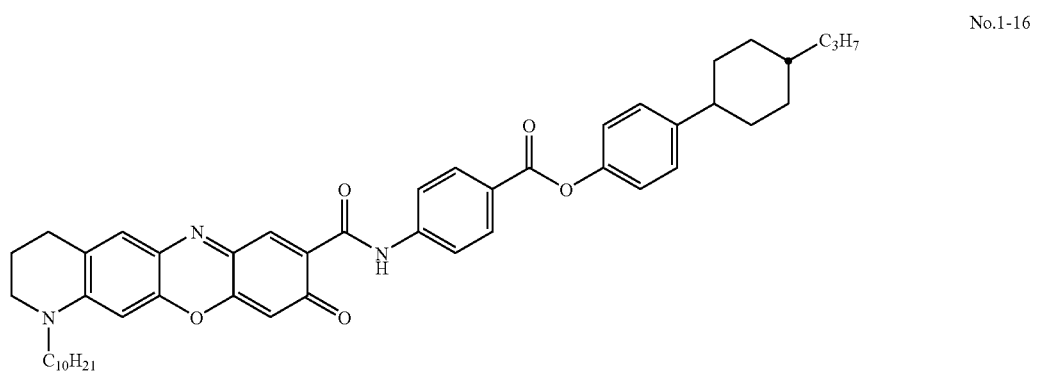

-continued

No.1-17

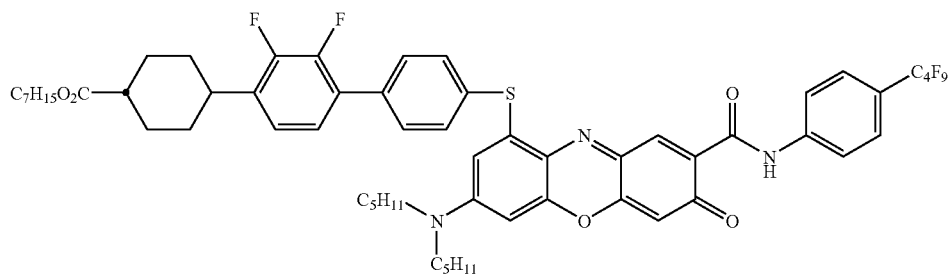

Specific examples of the azo type dichroic dyes usable in the present invention are shown below but the present invention is not restricted to the following specific examples.

No.2-1

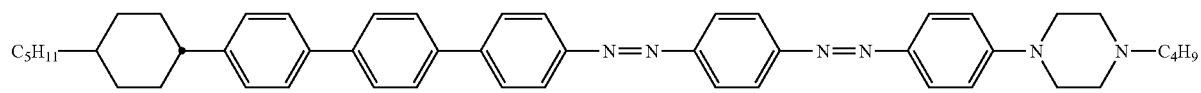

No.2-2

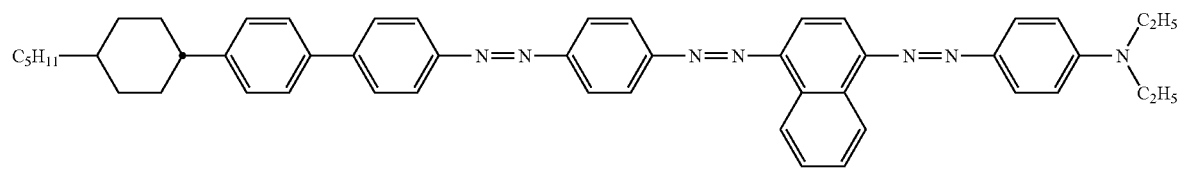

No.2-3

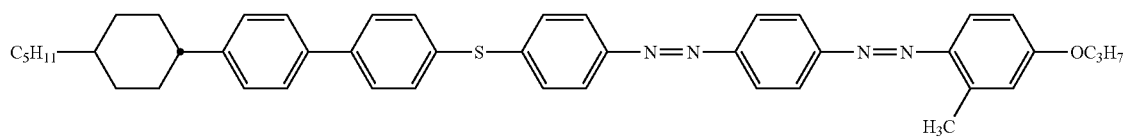

Specific examples of the dioxadine type dichroic dyes and merocyanine type dichroic dyes usable in the present invention are shown below but the present invention is not restricted to the following specific examples.

No.3-1

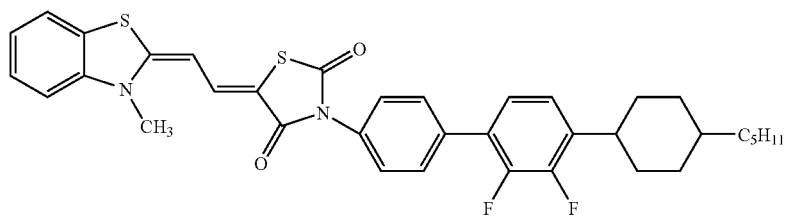

No.3-2

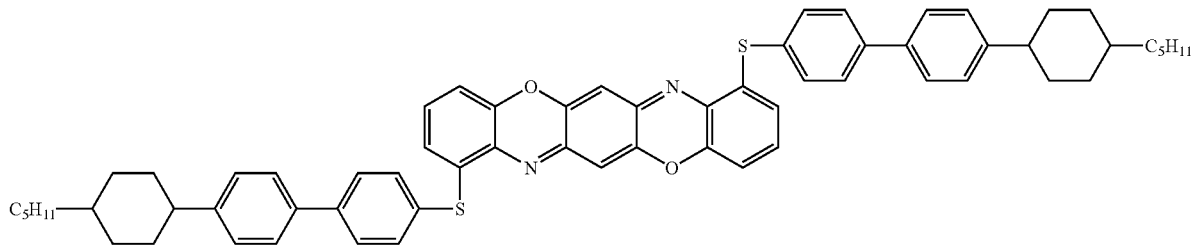

The dichroic dye having the substituent represented by the Formula (2) can be synthesized by combining known methods. They can be synthesized, for example, in accordance with the method described in JP-A No. 2003-192664.

The ratio of the dichroic dye to the host liquid crystal in the liquid crystal composition according to the invention is not particularly limited, as the absorption coefficient varies according to the dye, but is preferably 0.1 to 15 wt % and particularly preferably 0.2 to 8 wt %. In the invention, the host liquid crystal is a dual frequency addressable smectic A liquid crystal composition.

The dichroic dye can be dissolved to the host liquid crystal by utilizing mechanical stirring, heating, supersonic waves, or combination thereof. In addition, for the preparation of the liquid crystal composition of the present invention, known methods can be adopted.

[4] Orientation of Liquid Crystal

The orientation direction of the dual frequency addressable smectic A liquid crystal composition according to the invention is changed reversibly, by change of the frequency during application of voltage. Specifically, the dual frequency addressable smectic A liquid crystal composition according to the invention has the relationship shown in FIG. 3, between frequency and dielectric anisotropy $\Delta\varepsilon$ and thus orient itself in the direction vertical to the electrode when a voltage higher than the threshold level voltage is applied at a frequency lower than the crossover frequency, while in the direction parallel to the electrode when a voltage higher than the threshold level voltage is applied at a frequency higher than the crossover frequency.

Generally, a nematic liquid crystal compound is less viscous, while a smectic A phase liquid crystal compound is more viscous and more difficult to handle. Accordingly, a liquid crystal element of a liquid crystal composition containing a smectic A phase liquid crystal compound demanded high voltage and had a lower response speed. However, the liquid crystal composition according to the invention, which contains a nematic liquid crystal compound as the principal liquid crystal compound, gives a liquid crystal element that operates at low voltage and responds fast.

The smectic A liquid crystal composition according to the invention, which shows dual frequency addressing, allows change in orientation of the liquid crystal when voltage is applied at different frequencies, eliminating need for an additional oriented film and consequently, simplifying the element configuration and manufacturing process. In addition, the display performance is better without an oriented film, i.e., without light absorption or reflection by the oriented film, and shows high reflectivity when used in a reflective display.

2. Liquid Crystal Element

The liquid crystal element according to the invention includes a pair of electrodes, at least one of which is a transparent electrode, and a layer containing the smectic liquid crystal composition held between the pair of electrode. The shape of the smectic liquid crystal composition contained between the layers is not particularly limited, and, for example, the layer may be a liquid crystal layer of the dual frequency addressable smectic A liquid crystal composition; or alternatively as will be described below, the dual frequency addressable smectic A liquid crystal composition may be enclosed in microcapsule or dispersed in polymer.

The dual frequency addressable smectic A liquid crystal composition according to the invention can be used favorably in a display device in the guest-host system. The display device in the guest-host system is a device displaying by applying an electric field to cells enclosing a liquid crystal composition containing a dichroic dye dissolved in a host liquid crystal, changing the orientation of the dichroic dye together with the movement of the liquid crystal by the electric field, and thus, changing the absorption state of the cells. Such an element in the guest-host system allows operation without a polarization plate and thus allows display brighter than that by the conventional liquid crystal display method.

As the electrode substrate used for the liquid crystal element of the present invention, a glass or plastic substrate is usually used, the plastic substrate being preferred. The material for the plastic substrate used in the present invention includes, for example, acryl resin, polycarbonate resin, and epoxy resin, specifically, triacetyl cellulose (TAC), polyethylene terephthalate (PET), polyethylene naphthalate (PEN), syndiotactic polystyrene (SPC), polyphenylene sulfide (PPS), polycarbonate (PC), polyarylate (PAr), polysulfone (PSF), polyester sulfone (PES), polyether imide (PEI), cyclopolyolefin, and polyimide (PI), preferably polyethylene terephthalate (PET).

While the thickness of the plastic substrate is not particularly limited, it is preferably from 30 μm to 700 μm, more preferably from 40 μm to 200 μm, and further preferably 50 μm to 150 μm. In any of the cases, haze is preferably 3% or less, more preferably 2% or less, and further preferably 1% or less, and the total transmittance is preferably 70% or more, more preferably 80% or more, and further preferably 90% or more.

In the plastic substrate, improvers for resin such as plasticizers, dyes and pigments, antistatics, UV absorbents, antioxidants, inorganic fine particles, peeling promoters, leveling agents, and lubricants may be added optionally within a range not deteriorating the effect of the present invention.

The plastic substrate may be either light permeable or light impermeable. In a case of using light impermeable support as the support, a white support having light reflectivity can be used. The white support includes plastic substrate with addition of inorganic pigments such as titanium oxide or zinc oxide. In a case where the support constitutes a display surface, it is necessary that the support has permeability to at least a light in a visible region.

The substrate is described specifically, for example, in "Liquid Crystal Device Handbook" edited by Japan Society for the Promotion of Science, the 142th Committee, published from Nikkan Kogyo Shinbunsha, 1989, pp 218 to 231.

An electrode layer, preferably a transparent electrode layer, is formed on the surface of at least one of the pair of substrates.

For the electrode layer, indium oxide, indium thin oxide (ITO), tin oxide, etc. are used. For the transparent electrode, those described, for example, in "Liquid Crystal Device Handbook" edited by Japan Society for the Promotion of Science, the 142th Committee, published from Nikkan Kogyo Shinbunsha, 1989, pp 232 to 239 are used. The transparent electrode can be formed by a sputtering method, sol-gel method or printing method.

With an aim of orienting the liquid crystal in the liquid crystal element of the present invention, a layer applied with an orientation treatment may be formed to the surface where the liquid crystal and substrate are in contact with each other. The orientation treatment includes, for example, a method of orientation by coating a quaternary ammonium salt, a method of orientation by coating polyimide and applying a rubbing treatment, a method of orientation by vapor depositing $SiO_x$ in the oblique direction, and further, a method of orientation by photo-irradiation utilizing photo-isomerization. For the oriented film, those described, for example, in "Liquid Crystal Device Handbook" edited by Japan Society for the Promotion of Science, the 142th Committee, published from Nikkan Kogyo Shinbunsha, 1989, pp 240 to 256 are used.

However, as described above, the liquid crystal element according to the invention, which uses a smectic liquid crystal composition according to the invention allowing dual-frequency addressing, allows switching of the orientation of the liquid crystal only by adjustment of the applied voltage without an oriented film. Therefore, the liquid crystal element according to the invention may have or may not have an oriented film, and has advantages without the oriented film that the configuration is simplified and there is no deterioration in display characteristics due to the oriented film.

In the liquid crystal element of the present invention, a space of 1 to 50 μm may be formed between a pair of substrates to each other by way of a spacer, and the liquid crystal can be injected into the space. For the spacer, those described, for example, in "Liquid Crystal Device Handbook" edited by Japan Society for the Promotion of Science, the 142th Committee, published from Nikkan Kogyo Shinbunsha, 1989, pp 257 to 262 are used. The liquid crystal composition of the present invention can be disposed between the substrates by coating or printing on the substrate.

The liquid crystal element of the present invention may further have a white reflection plate, anti-reflection film, brightness improving film, etc.

The liquid crystal element of the present invention can be addressed by a passive matrix addressing system or an active matrix addressing system using, for example, a thin film transistor (TFT). The addressing system is described specifically, for example, in "Liquid Crystal Device Handbook" (edited by Japan Society for the Promotion of Science, the 142th Committee, published from Nikkan Kogyo Shinbunsha, 1989), pp 387 to 460, which can be utilized as the addressing method for the liquid crystal element of the present invention.

For the addressing of the liquid crystal element of the present invention, a voltage in a low frequency region and that in a high frequency region are used. While a preferred range of the frequency region of the voltage applied to the liquid crystal layer is different, for example, depending on the type of the liquid crystal composition used, the cross-over frequency of the liquid crystal composition, etc., the frequency region of the electric field applied generally to the liquid crystal composition is preferably from 0.1 Hz to 10 MHz, and more preferably from 1 Hz to 1 MHz. The low frequency region to be used generally ranges preferably from 0.1 Hz to 100 kHz, more preferably from 1 Hz to 10 kHz, and further preferably from 10 Hz to 5 kHz. Further, the high frequency region to be used generally ranges preferably from 100 Hz to 10 MHz, more preferably from 100 Hz to 1 MHz, and further preferably from 1 kHz to 1 MHz.

In the liquid crystal layer according to the invention, multiple dichroic dyes may be mixed in one liquid crystal composition. The color of the liquid crystal composition is also not limited. For example, when a black liquid crystal composition is prepared by mixing multiple dichroic dyes, it can be used as a liquid crystal element for a display turning black or white by application of voltage. It is also possible to prepare a liquid crystal element for color display, by preparing liquid crystal compositions colored respectively in red, green and blue and placing the three kinds of compositions on a substrate side by side.

On the other hand, the liquid crystal layer according to the invention may have a laminated structure held between a pair of electrodes, as described, for example, in JP-A No. 10-90, 715. As described on the displaying method of the liquid crystal element according to the invention, it is preferable to add dichroic dyes in the subtractive or complementary relationship to the layer in the lamination direction. Examples thereof include a three-layered laminate configuration of layers of liquid crystal compositions colored in yellow, magenta and cyan; a two-layered laminate configuration of a layer of liquid crystal compositions colored in yellow, magenta and cyan and a layer of liquid crystal compositions colored in complementary blue, green and red colors placed side by side; a two-layered laminate configuration of a layer of a liquid crystal composition colored in black and a layer of liquid crystal compositions colored in red, blue and green placed side by side; and the like.

As described, for example, in JP-A No. 11-24,090, the liquid crystal layer according to the invention may contain additionally a liquid crystal composition as microcapsule. Such a microcapsule contains a polymer resin as its wall material and a dual frequency addressable smectic A liquid crystal composition containing the dichroic dye enclosed by the wall material. Any known method may be used for preparation thereof, as it is properly selected.

As described in JP-A Nos. 5-61,025, 5-265,053, 6-3,691, 6-23,061, 5-203,940, 6-242,423, 6-289,376, 8-278,490, and 9-813174, the liquid crystal layer according to the invention may be a polymer-dispersion liquid crystal.

The polymer-dispersion liquid crystals according to the invention, are grouped roughly into so-called PDLC's (Polymer Dispersed Liquid Crystals) in which a liquid crystal fills the voids in a polymeric material having independent voids and the liquid crystal has a discontinuous phase, and so-called PNLC's (Polymer Network Liquid Crystals) in which a liquid crystal fills the continuous voids in a polymeric material and thus the liquid crystal has a continuous phase, but the liquid crystal according to the invention may be any of them. The polymer-dispersion liquid crystal may be prepared by any one of known methods, as it is properly selected. In addition, in the invention, the polymer-dispersion liquid crystal may be laminated.

Because it is possible to contain different dual frequency addressable smectic A liquid crystal compositions in the independent void in the laminated structure, microcapsule, or polymer-dispersion liquid crystal, it is possible to address the dual frequency addressable smectic A liquid crystal compositions contained in each layer, microcapsule, or independent void independently.

3. Method of Displaying Liquid Crystal Element

Hereinafter, the method of addressing the liquid crystal composition independently will be described. In such a case, the multiple dual frequency addressable smectic A liquid crystal composition contained in each layer, microcapsule, or independent void has a different threshold voltage. Each multiple dual frequency addressable smectic A liquid crystal composition is preferably a liquid crystal composition having a different crossover frequency. When the crossover frequencies are different, it is possible to switch orientation of each liquid crystal composition by frequency as well as threshold voltage.

The following relationship is established between the threshold voltage and the dielectric anisotropy of the smectic A liquid crystal in which the threshold voltage lowers as the dielectric anisotropy increases. Accordingly, a plurality of liquid crystal compositions can be addressed independently by changing the applied voltage while considering the threshold voltage for each of the liquid crystal layers.

$$Vc = 8\pi^2 d\, (K_{11}B)^{1/2} \cdot (\in_{//}/(\in_{\perp} \cdot \Delta\in))$$

in which Vc is the threshold voltage, $K_{11}$ is an elastic constant, B is a coefficient representing the layer elasticity, $\Delta\epsilon$ is the dielectric anisotropy ($\epsilon$// is a dielectric constant in the direction of the molecular major axis, $\epsilon\perp$ is a dielectric constant in the direction of the molecular minor axis), and d is a cell gap.

Measurement of the threshold voltage of a liquid crystal composition, which has a smaller response speed, is difficult in an apparatus commonly used for measurement of nematic liquid crystals. Thus, the threshold voltage is determined by measuring the change in absorbance after application of voltage for a certain period.

The threshold voltages of dual frequency addressable smectic A liquid crystal composition when addressed independently will be described. When the threshold voltages of two or more dual frequency addressable smectic A liquid crystal compositions at low frequency are designated respectively as Ea, Eb, Ec, - - - and Ex, and those at high frequency, as E'a, E'b, E'c, - - - and E'x, the following relationships are preferably satisfied: Ea<Eb<Ec< - - - <Ex, and E'a<E'b<E'c< - - - <E'x. The threshold voltages having the same suffix (a, b, . . . , or x) are those of the same dual frequency addressable smectic A liquid crystal composition.

For example, when a dual frequency addressable smectic A liquid crystal composition contains three kinds of smectic A liquid crystals, the threshold voltage of the first dual frequency addressable smectic A liquid crystal composition at low frequency is designated as Ea, the threshold voltage thereof at high frequency as E'a, the threshold voltage of the second dual frequency addressable smectic A liquid crystal composition at low frequency as Eb, the threshold voltage thereof at high frequency as E'b, the threshold voltage of the third dual frequency addressable smectic A liquid crystal composition at low frequency as Ec, and the threshold voltage thereof at high frequency as E'c, the following relationships are preferably satisfied: Ea<Eb<Ec, and E'a<E'b<E'c.

Each of the threshold voltages Ea, Eb, Ec - - - Ex, and E'a, E'b, E'c - - - E'x is within a range of preferably from 0 V/µm to 30 V/µm, more preferably from 1 V/µm to 20 V/µm, and further preferably from 1 V/µm to 15 V/µm.

The differences between the threshold voltages of the dual frequency addressable smectic A liquid crystal composition at a specific frequency, for example, the difference between Ea and Eb, and the difference between Eb and Ec, or the difference between E'a and E'b, and the difference between E'b and E'c, etc. are preferably from 0.1 V/µm to 15 V/µm, more preferably from 0.1 V/µm to 5 V/µm, and particularly preferably from 0.2 V/µm to 3 V/µm, independently from each other.

Hereinafter, a display of a liquid crystal element containing two kinds of dual frequency addressable smectic A liquid crystal compositions having different threshold voltages will be described.

Figure 4A:
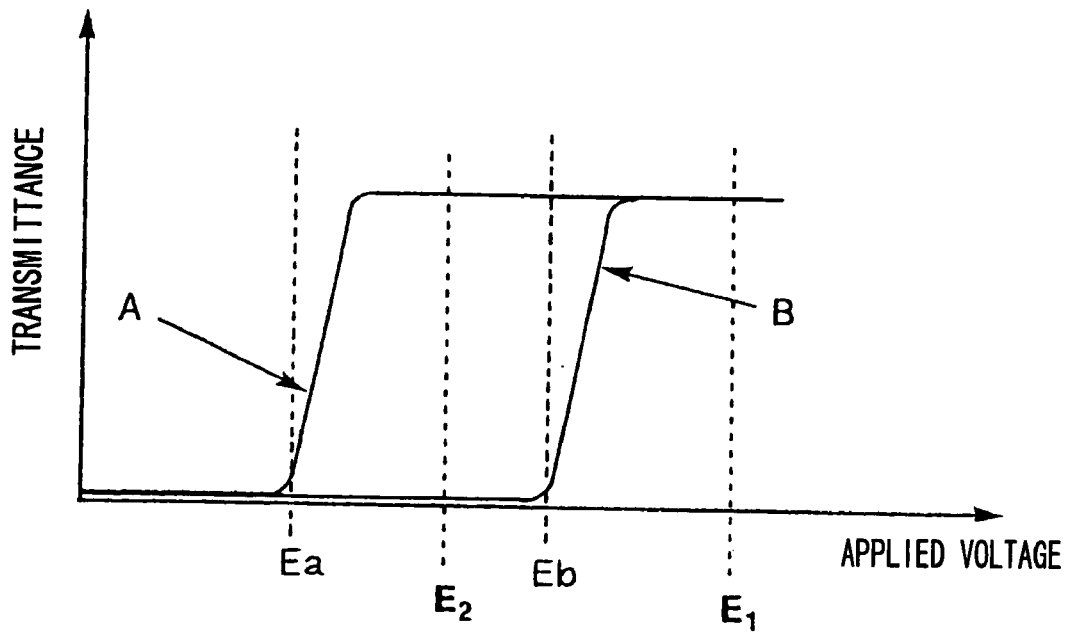
FIG. 4A is a graph for explaining a relationship between a threshold voltage and a transmittance at a low frequency and a high frequency in two types of dual frequency addressable smectic A liquid crystal compositions.
Figure 4B:
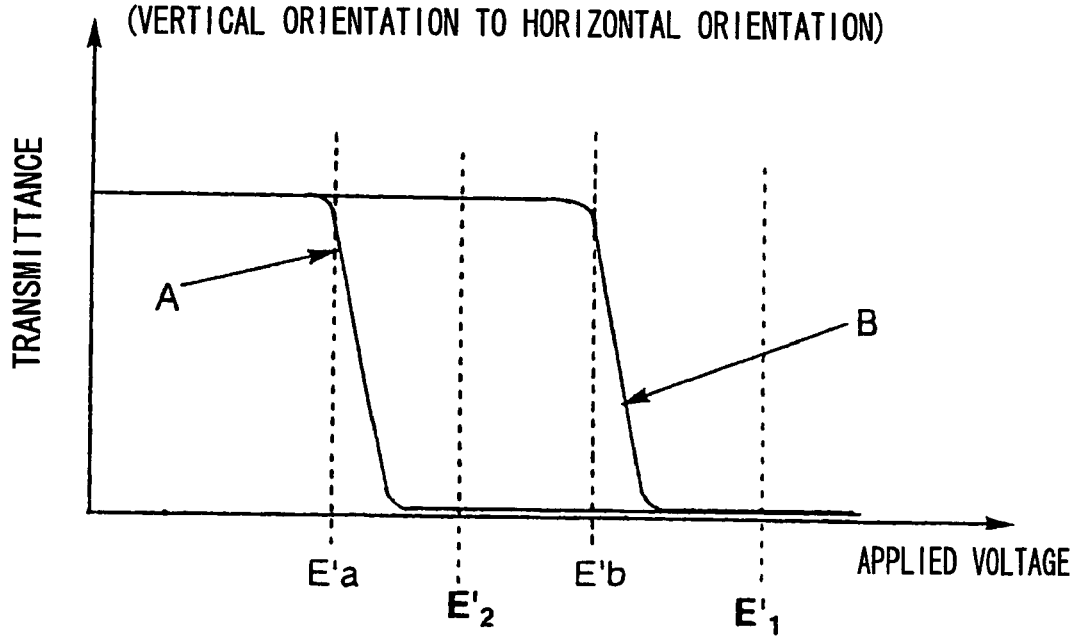
FIG. 4B is a graph for explaining a relationship between a threshold voltage and a transmittance at a low frequency and a high frequency in two types of dual frequency addressable smectic A liquid crystal compositions.

FIGS. 4A and 4B show the "relationship between threshold voltage and transmittance at low frequency and high frequency" in two types of dual frequency addressable smectic A liquid crystal compositions. A guest-host liquid crystal element using a liquid crystal composition containing the two types of the dual frequency addressable smectic A liquid crystal compositions and dichroic dyes exhibiting colors A and B can display the colors of white, black, A, and B by using a white scattering plate.

Below, a dual frequency addressable smectic A liquid crystal composition containing a dichroic dye exhibiting color A is referred to as "liquid crystal composition A" and a dual frequency addressable smectic A liquid crystal composition containing a dichroic dye exhibiting color B which is a color complementary to A is referred to as "liquid crystal composition B". The color A and the color B are in a relationship in which they are complementary to each other such as "blue and yellow", "green and magenta", "red and cyan", etc.

Description will be made for an example in a case where the liquid crystal compositions are subjected to orientation treatment such that the state of initial orientation is in a horizontal orientation, both of the two liquid crystal compositions have a dielectric constant anisotropy $\Delta\epsilon$ which is positive at a low frequency and becomes negative at a high frequency, and the dichroic dyes are of a positive type.

In FIGS. 4A and 4B, $E_1$ is a voltage which is higher than the respective threshold voltages Ea and Eb at a low frequency in each of the two liquid crystal compositions A and B. $E_2$ is a voltage which is higher than the threshold voltage Ea for the liquid crystal composition A at the low frequency, and which is lower than the threshold voltage Eb for the liquid crystal composition B at the low frequency.

$E'_1$ is a voltage which is higher than the respective threshold voltages E'a and E'b at a high frequency in each of the two liquid crystal compositions A and B. $E'_2$ is a voltage which is higher than the threshold voltage E'a for the liquid crystal composition A at the high frequency, and which is lower than the threshold voltage E'b for the liquid crystal composition B at the high frequency. That is, the relationships between the voltages described above are as shown below.

$$Ea < E_2 < Eb < E_1 \tag{1}$$

$$E'a < E'_2 < E'b < E'_1 \tag{2}$$

In a case where no voltage is applied in the initial orientation state, both of the dual frequency addressable smectic A liquid crystal compositions contained in the two liquid crystal compositions A and B are in a horizontal orientationhorizontal orientation, and correspondingly, the dichroic dyes are also in a horizontal orientationhorizontal orientation. Since the dichroic dyes of the positive type as described above, the dichroic dyes in the horizontal orientationhorizontal orientation exhibit respective colors. In this case, since the dichroic dyes contained in the dual frequency addressable smectic A liquid crystal compositions respectively exhibit colors A and B which have a complementary relationship, they display a black color in admixture.

Then, when the voltage $E_2$ is applied at the low frequency, the orientation of the liquid crystal contained in the liquid crystal composition A changes since the voltage higher than the threshold voltage Ea of the dual frequency addressable smectic A liquid crystal composition contained in the liquid crystal composition A has been applied. Since the dual frequency addressable smectic A liquid crystal composition used herein has a positive dielectric constant anisotropy $\Delta\epsilon$, the orientation of the liquid crystal changes in a direction identical to the electric field generated by the application of the voltage. As a result, the liquid crystal is oriented perpendicular to the substrate, and correspondingly, the dichroic dye is also oriented in the perpendicular direction. Since the dichroic dye is of the positive type, it ceases to exhibit a color when oriented in the perpendicular direction. That is, only the color B of the dichroic dye contained in the liquid crystal composition B is exhibited.

When the voltage $E_1$ is applied at the low frequency, the orientation of the liquid crystal contained in the liquid crystal composition B changes since the voltage higher than the threshold voltage Eb of the dual frequency addressable smectic A liquid crystal composition contained in the liquid crystal composition B has been applied. The oriented direction changes in the same manner as in the liquid crystal composition A, and as a result, the dichroic dye contained in the liquid crystal composition B also ceases to exhibit color. That is, since neither of the dichroic dyes contained in the liquid crystal composition A and the liquid crystal composition B exhibits color, white color is displayed by the white scattering plate.

After the application of the voltage $E_1$ at the low frequency, when the frequency is changed to a high frequency, the sign of the dielectric anisotropy changes and swiches from positive to negative. When the voltage $E'_2$ is applied, in the liquid crystals contained in the liquid crystal compositions A and B both of which were oriented in the perpendicular direction, only the liquid crystal contained in the liquid crystal composition A undergoes a change in orientation from the perpendicular direction to the horizontal direction. Thus, the dichroic dye contained in the liquid crystal composition A is also oriented in the horizontal direction, and the positive type dichroic dye exhibits color A. Since the orientation of the liquid crystal composition B is kept as it is, it does not exhibit color. As a result, only the color A is exhibited to display the color A.

When the applied voltage $E'_2$ is changed to the voltage $E'_1$, the orientation of the liquid crystal contained in the liquid crystal composition B also changes from the perpendicular direction to the horizontal direction, the dichroic dye contained in the liquid crystal composition B is thereby oriented in the horizontal direction, and the positive type dichroic dye exhibits color B. As a result, colors A and B are exhibited, and since they have a complementary relationship, they display a black color in admixture.

From the foregoing, display of the colors white, black, A, and B can be carried out. The operations are summarized in the following Table 1. In the Table "⇒"indicates that a next voltage is applied after the application of voltage.

TABLE 1

| Display | Operation |
| --- | --- |
| White | $E_1$ at low frequency |
| Black | No application, or $E'_1$ at high frequency |
| Color A | $E_1$ at low frequency ⇒ $E'_2$ at high frequency |
| Color B | $E_2$ at low frequency |

In the example described above, while the state of initial orientation has been explained for a case in which the orientation is in the horizontal direction, the invention is not limited thereto.

Figure 5:
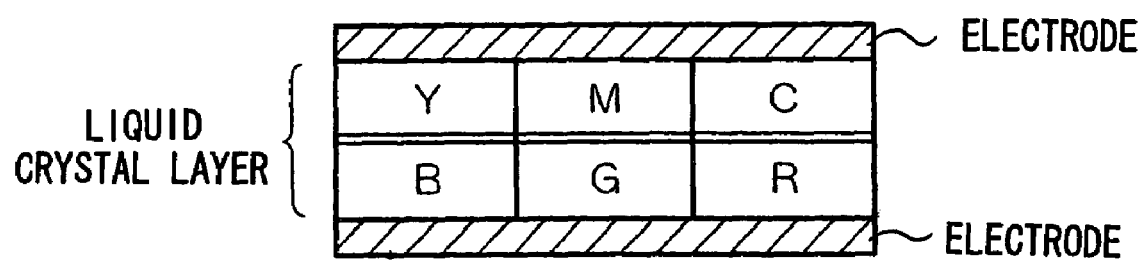
FIG. 5 is a view showing an example of a liquid crystal layer formed in a state of lamination and side-by-side arrangement in a liquid crystal element according to the present invention.

Further, as shown in the cross sectional view in FIG. 5, in the guest-host liquid crystal element which has complementary color relationships in the direction of lamination, full color display can be attained by side by side arrangement of liquid crystal elements of blue (B), green (G), and red (R).

Hereinafter, display of a liquid crystal element containing three kinds of dual frequency addressable smectic A liquid crystal compositions having different threshold voltages will be described.

Figure 6A:
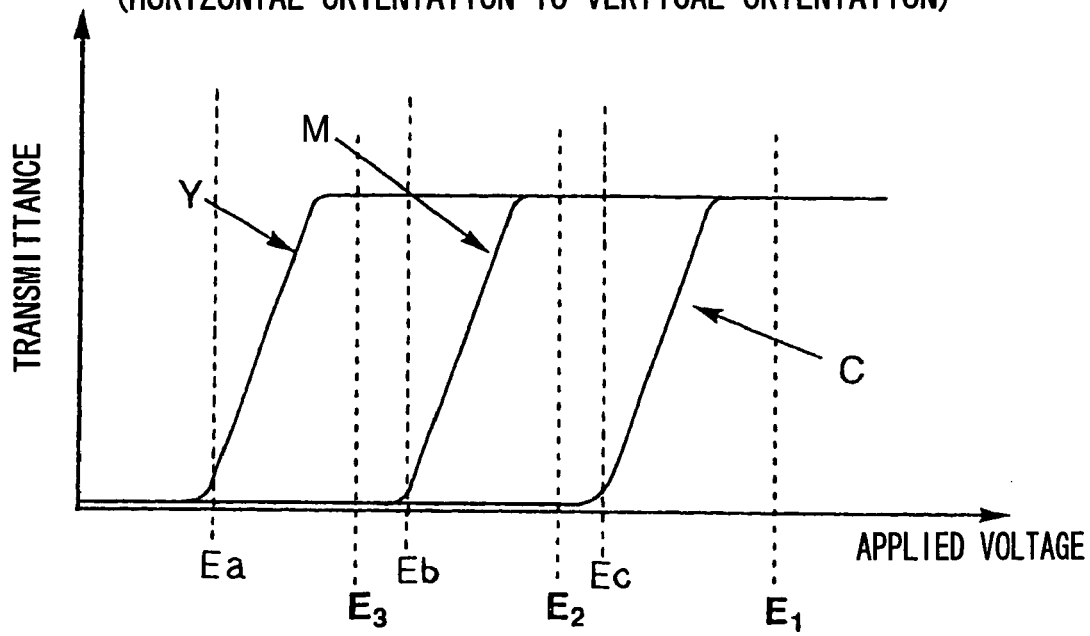
FIG. 6A is a graph for explaining a relationship between a threshold voltage and a transmittance at a low frequency and a high frequency in three types of dual frequency addressable smectic A liquid crystal compositions.
Figure 6B:
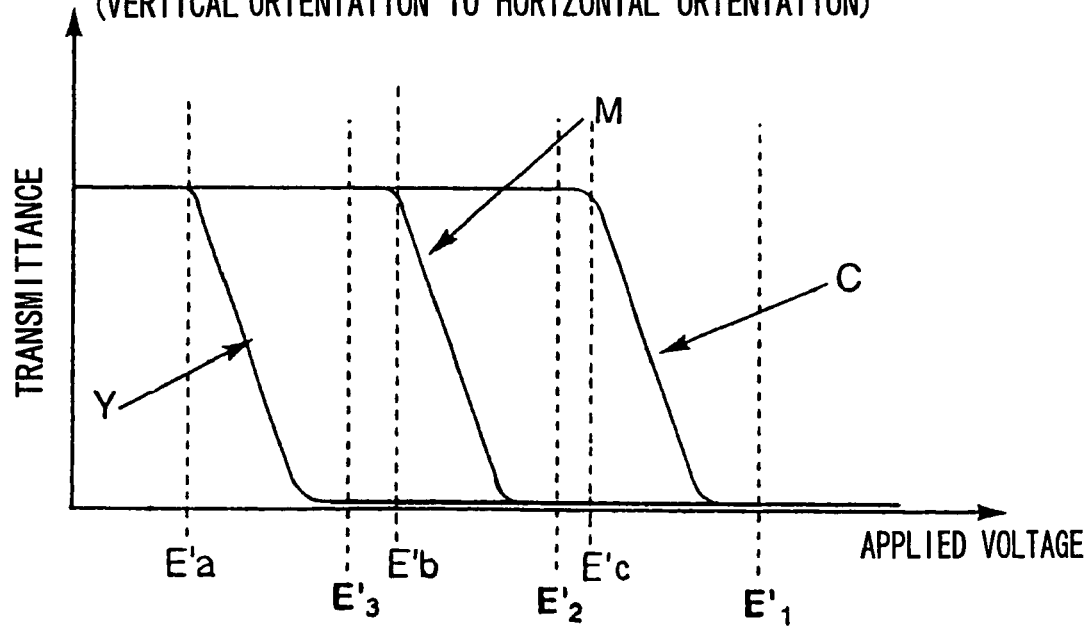
FIG. 6B is a graph for explaining a relationship between a threshold voltage and a transmittance at a low frequency and a high frequency in three types of dual frequency addressable smectic A liquid crystal compositions.

FIGS. 6A and 6B show the "relationship between threshold voltage and transmittance at low frequency and high frequency" in three types of the dual frequency addressable smectic A liquid crystal composition. A guest-host liquid crystal element using a liquid crystal composition containing the three types of the dual frequency addressable smectic A liquid crystal composition and dichroic dyes exhibiting three colors of yellow, magenta, and cyan can perform full-color display by using a white scattering plate.

Below, a dual frequency addressable smectic A liquid crystal composition containing a dichroic dye exhibiting yellow color is referred to as "liquid crystal composition Y", a dual frequency addressable smectic A liquid crystal composition containing a dichroic dye of magenta is referred to as "liquid crystal composition M", and a dual frequency addressable smectic A liquid crystal composition containing a dichroic dye of cyan is referred to as "liquid crystal composition C".

Description will be made for an example in a case where the liquid crystal compositions are subjected to orientation treatment such that the state of initial orientation is in a horizontal orientation, all of three types of liquid crystal compositions have a dielectric constant anisotropy $\Delta\in$ which is positive at a low frequency and becomes negative at a high frequency, and the dichroic dyes are of a positive type.

In FIGS. 6A and 6B, $E_1$ is a voltage higher than the respective threshold voltage Ea, Eb and Ec at a low frequency for each of three types of the liquid crystal compositions Y, M and C. $E_2$ is a voltage higher than the respective threshold voltages Ea and Eb of the liquid crystal compositions Y and M at the low frequency and lower than the threshold voltage Ec of the liquid crystal composition C at the low frequency. $E_3$ is a voltage higher than the threshold voltage Ea for the liquid crystal composition Y at the low frequency and lower than the respective threshold voltages Eb and Ec of the liquid crystal compositions M and C at the low frequency.

$E'_1$ is a voltage higher than the respective threshold voltages E'a, E'b and E'c at a high frequency in each of the three types of liquid crystal compositions Y, M and C. $E'_2$ is a voltage higher than the respective threshold voltages E'a and E'b for the liquid crystal compositions Y and M at the high frequency and lower than the threshold voltage E'c for the liquid crystal composition C at the high frequency. $E'_3$ is a voltage higher than the threshold voltage E'a for the liquid crystal composition Y at the low frequency and lower than the respective threshold voltages E'b and E'c for the liquid crystal compositions M and C at the low frequency. The relationships for the voltages described above are as shown below.

$$Ea<E_3<Eb<E_2<Ec<E_1 \quad (1)$$

$$E'a<E'_3<E'b<E'_2<E'c<E'_1 \quad (2)$$

In a case where no voltage is applied in the initial orientation state, all of the dual frequency addressable smectic A liquid crystals contained in the three types of liquid crystal compositions Y, M and C are in the horizontal orientation, and correspondingly, the dichroic dyes are also in a horizontal orientation. Since the dichroic dyes are the positive type as described above, the dichroic dyes in the horizontal orientation exhibit respective colors. In this case, since the dichroic dyes contained in the three liquid crystal composition respectively exhibit colors of yellow (Y), magenta (M), and cyan (C), they display a black color in admixture.

Then, when the voltage $E_3$ is applied at the low frequency, the orientation of the liquid crystal contained in the liquid crystal composition Y changes since the voltage higher than the threshold voltage Ea of the dual frequency addressable smectic A liquid crystal composition contained in the liquid crystal composition Y has been applied. Since the dual frequency addressable smectic A liquid crystal composition used herein has positive dielectric constant anisotropy $\Delta\in$, the orientation of the liquid crystal changes in a direction identical to the electric field generated by the application of the voltage. As a result, the liquid crystal is oriented perpendicular to the substrate, and correspondingly, the dichroic dye is also oriented in the perpendicular direction. Since the dichroic dye is of the positive type, it ceases to exhibit a color when oriented in the perpendicular direction. That is, magenta and cyan due to the liquid crystal compositions M and C are exhibited to display blue in admixture.

When the voltage $E_2$ is applied at the low frequency, the orientation of the liquid crystal contained in the liquid crystal composition M changes since the voltage higher than the threshold voltage Eb of the dual frequency addressable smectic A liquid crystal composition contained in the liquid crystal composition M has been applied. The oriented direction changes in the same manner as in the liquid crystal composition Y, and as a result, the dichroic dye contained in the liquid crystal composition M also ceases to exhibit color. That is, neither of the dichroic dyes contained in the liquid crystal compositions Y and M exhibits color, only the dichroic dye contained in the liquid crystal composition C exhibits color, and as a result, cyan is displayed.

When the voltage $E_3$ is applied at the low frequency, the orientation of the liquid crystal contained in the liquid crystal composition C also changes since a voltage higher than the threshold voltage Ec of the dual frequency addressable smectic A liquid crystal composition contained in the liquid crystal composition C has been applied. As a result, all the dichroic dyes contained in the liquid crystal compositions Y, M and C do not exhibit colors and white color is displayed by a white scattering plate.

On the other hand, after the application of the voltage $E_1$ at the low frequency, when the frequency is changed to a high frequency, the sign of the dielectric anisotropy changes and switches from positive to negative. When the voltage at $E'_3$ is applied, in the liquid crystals contained in the liquid crystal compositions Y, M and C, all of which were oriented in the perpendicular direction, only the liquid crystal contained in the liquid crystal composition Y undergoes a change in orientation to the horizontal direction. Thus dichroic dye contained in the liquid crystal composition Y is also oriented in the horizontal direction, and the positive type dichroic dye exhibits a yellow color. Since the orientations of the liquid crystal compositions M and C are kept as it is, they do not exhibit color. As a result, a yellow color is displayed.

After the application of the voltage $E_1$ at the low frequency, when the voltage $E'_1$ at the high frequency is applied, the orientations of the liquid crystals contained in the liquid crystal compositions Y and M undergo a change in orientation from the perpendicular direction to the horizontal direction. Since also the dichroic dyes are oriented in the horizontal direction, the positive dichroic dyes exhibit color. As a result, yellow and magenta are exhibited by the dichroic dyes contained in the liquid crystal composition Y and M and they display a red color in admixture.

When the frequency is changed from the high frequency to the low frequency in a state of displaying the red color, the sign of the dielectric anisotropy changes again and switches from negative to positive. In this case, when the voltage $E_3$ is applied, in the liquid crystals contained in the liquid crystal compositions Y and M oriented in the horizontal direction, since only the liquid crystal contained in the liquid crystal composition Y changes the orientation in the perpendicular direction, the dichroic dye contained in the liquid crystal composition Y ceases to exhibit color. As a result, only the liquid crystal composition M is oriented in the horizontal direction and the dichroic dye contained therein displays magenta.

Further, when the frequency is changed from the high frequency to the low frequency after applying the voltage $E_2$ at the low frequency, the sign of the dielectric anisotropy changes and switchs from positive to negative. In this case, when the voltage $E'_3$ is applied, in the liquid crystal contained in the liquid crystal compositions Y and M oriented in the perpendicular direction, only the liquid crystal contained in the liquid crystal composition Y undergoes a change in orientation in the horizontal direction. As a result, the liquid crystal compositions C and Y are oriented in the horizontal direction, and the dichroic dyes contained therein exhibit cyan and yellow and display green in admixture.

Further, when voltage $E'_1$ at the high frequency is applied, all the liquid crystal compositions Y, M and C are oriented in the horizontal direction, and since all the dichroic dyes contained therein exhibit colors, they display a black color in admixture.

From the foregoing, full color of white, black, yellow, magenta, cyan, blue, green, and red can be displayed. The operations are summarized in the following Table 2. In the Table "⇒" indicates that a succeeding voltage is applied after the voltage application.

TABLE 2

| Display | Operation |
|---------|-----------|
| White | $E_1$ at low frequency |
| Black | No application, or $E'_1$ at high frequency |
| Yellow | $E_1$ at low frequency ⇒ $E'_3$ at high frequency |
| Magenta | $E_1$ at low frequency ⇒ $E'_2$ at high frequency ⇒ $E_3$ at low frequency |
| Cyan | $E_2$ at low frequency |
| Blue | $E_3$ at low frequency |
| Green | $E_2$ at low frequency ⇒ $E'_3$ at high frequency |
| Red | $E_1$ at low frequency ⇒ $E'_2$ at high frequency |

In the example described above, while the state of initial orientation has been explained for a case in which the orientation is in the horizontal direction, the present invention is not limited thereto. Further, the order for the level of the respective threshold voltages for Y, M and C is not restricted to: Y<M<C but may in any of: Y<C<M, M<Y<C, M<C<Y, C<M<Y, and C<Y<M.

4. Application

The dual frequency addressable smectic A liquid crystal composition according to the invention can be used widely in production of liquid crystal elements, in particular of liquid crystal display elements in the guest-host system. A liquid crystal display element in the guest-host system prepared by using the dual frequency addressable smectic A liquid crystal composition according to the invention, which displays an nonvolatile image at a high display contrast ratio, and has a memory property can be used favorably as a reflective display material and a light-controlling material.

Hereinafter, exemplary embodiments of the invention will be listed.

[1] A dual frequency addressable smectic A liquid crystal composition having a crossover frequency, comprising at least a first nematic liquid crystal compound or composition and a second nematic liquid crystal compound or composition.

[2] The dual frequency addressable smectic A liquid crystal composition of [1], wherein the smectic A phase is induced by mixing of at least the first nematic liquid crystal compound or composition and the second nematic liquid crystal compound or composition.

[3] The dual frequency addressable smectic A liquid crystal composition of [1] or [2], wherein the first nematic liquid crystal compound or composition exhibits dual frequency addressability.

[4] The dual frequency addressable smectic A liquid crystal composition of any one of [1] to [3], wherein the second nematic liquid crystal compound or composition exhibits dual frequency addressability.

[5] The dual frequency addressable smectic A liquid crystal composition of any one of [1] to [4], wherein the second nematic liquid crystal compound or composition contains a nematic liquid crystal compound having a polarized group on the molecular major axis of the compound.

[6] The dual frequency addressable smectic A liquid crystal composition of [5], wherein the polarized group is a perfluoroalkoxy group having 1 to 10 carbon atoms, a perfluoroalkyl group having 1 to 10 carbon atoms, a halogen atom or a cyano group.

[7] The dual frequency addressable smectic A liquid crystal composition of any one of [1] to [6], wherein a ratio of the first nematic liquid crystal compound to the second nematic liquid crystal compound is in a range of from 20:80 mol % to 99.9:0.1 mol %.

[8] The dual frequency addressable smectic A liquid crystal composition of any one of [1] to [7], wherein the orientation direction is switched reversibly by change of the frequency during application of voltage.

[9] The dual frequency addressable smectic A liquid crystal composition of any one of [1] to [8], further comprising a third liquid crystal compound or composition exhibiting dual frequency addressability, wherein a difference of a dielectric anisotropy $\Delta\in$ between the low frequency and the high frequency of the third liquid crystal compound or composition is 6 or more, and the dielectric anisotropy $\Delta\in$ at the high frequency is −8 or less.

[10] The dual frequency addressable smectic A liquid crystal composition of any one of [1] to [9], further comprising at least one dichroic dye.

[11] A liquid crystal element having a pair of electrodes, at least one of which is a transparent electrode, and a liquid crystal layer held between the pair of electrodes, the liquid crystal layer comprising one dual frequency addressable smectic A liquid crystal composition having a crossover frequency containing at least a first nematic liquid crystal compound or composition and a second nematic liquid crystal compound or composition.

[12] The liquid crystal element of [11], wherein the liquid crystal layer contains at least two of the dual frequency addressable smectic A liquid crystal compositions having different threshold voltages.

[13] The liquid crystal element of [11] or [12], wherein the liquid crystal layer contains at least two of the dual frequency addressable smectic A liquid crystal compositions having different crossover frequencies.

[14] The liquid crystal element of [12] or [13], wherein, when the at least two dual frequency addressable smectic A liquid crystal compositions having different threshold voltages are a first dual frequency addressable smectic A liquid crystal composition and a second dual frequency addressable smectic A liquid crystal composition; the threshold voltage of the first dual frequency addressable smectic A liquid crystal composition at a frequency lower than the crossover frequency is designated as Ea; the threshold voltage of the first dual frequency addressable smectic A liquid crystal composition at a frequency higher than the crossover frequency is designated as E'a; the threshold voltage of the second dual frequency addressable smectic A liquid crystal composition at a frequency lower than the crossover frequency is designated as Eb; and the threshold voltage of the second dual frequency addressable smectic A liquid crystal composition at a voltage higher than the crossover frequency is designated as E'b: Ea is smaller than Eb, and E'a is smaller than E'b.

[15] The liquid crystal element of [14], wherein the first and second dual frequency addressable smectic A liquid crystal compositions contain dichroic dyes respectively, and the dichroic dye in the first dual frequency addressable smectic A liquid crystal composition and the dichroic dye in the second dual frequency addressable smectic A liquid crystal composition have at least one complementary relationship selected from the group consisting of yellow and blue, magenta and green, and cyan and red.

[16] The liquid crystal element of [12] or [13], wherein, when the at least two dual frequency addressable smectic A liquid crystal compositions having different threshold voltages contain a first dual frequency addressable smectic A liquid crystal composition and a second dual frequency addressable smectic A liquid crystal composition and a third dual frequency addressable smectic A liquid crystal composition; the threshold voltage of the first dual frequency addressable smectic A liquid crystal composition at a frequency lower than the crossover frequency is designated as Ea; the threshold voltage of the first dual frequency addressable smectic A liquid crystal composition at a frequency higher than the crossover frequency is designated as E'a; the threshold voltage of the second dual frequency addressable smectic A liquid crystal composition at a frequency lower than the crossover frequency is designated as Eb; the threshold voltage of the second dual frequency addressable smectic A liquid crystal composition at a frequency higher than the crossover frequency is designated as E'b; the threshold voltage of the third dual frequency addressable smectic A liquid crystal composition at a frequency lower than the crossover frequency is designated as Ec; and the threshold voltage of the third dual frequency addressable smectic A liquid crystal composition at a frequency higher than the crossover frequency is designated as E'c, the following relationships are satisfied: Ea<Eb<Ec, and E'a<E'b<E'c.

[17] The liquid crystal element of [16], wherein, the first, second and third dual frequency addressable smectic A liquid crystal compositions contain dichroic dyes different in absorption respectively, and each of the dichroic dyes absorbs any of yellow, magenta, or cyan.

[18] The liquid crystal element of [11] or [17], wherein a plurality of the liquid crystal layer is laminated.

[19] The liquid crystal element of [18], wherein, the liquid crystal layers are polymer medium layers containing the dual frequency addressable smectic A liquid crystal compositions dispersed in a polymer medium, and the polymer medium layers are laminated.

[20] The liquid crystal element of [19], wherein, the polymer medium is gelatin.

[21] The liquid crystal element of any one of [11] to [18], wherein, the liquid crystal layer contains the dual frequency addressable smectic A liquid crystal composition enclosed in a microcapsule.

[22] A reflective display material comprising the liquid crystal element of any one of [11] to [21].

[23] A light-controlling material comprising the liquid crystal element of any one of [11] to [21].

EXAMPLES

Then, examples are shown below for further describing the present invention more in details but the present invention is not restricted thereto.

<Nematic Liquid Crystal Compound (4)>

—First Nematic Liquid Crystal Compound—

A nematic liquid crystal compound (4) was prepared according to the following scheme.

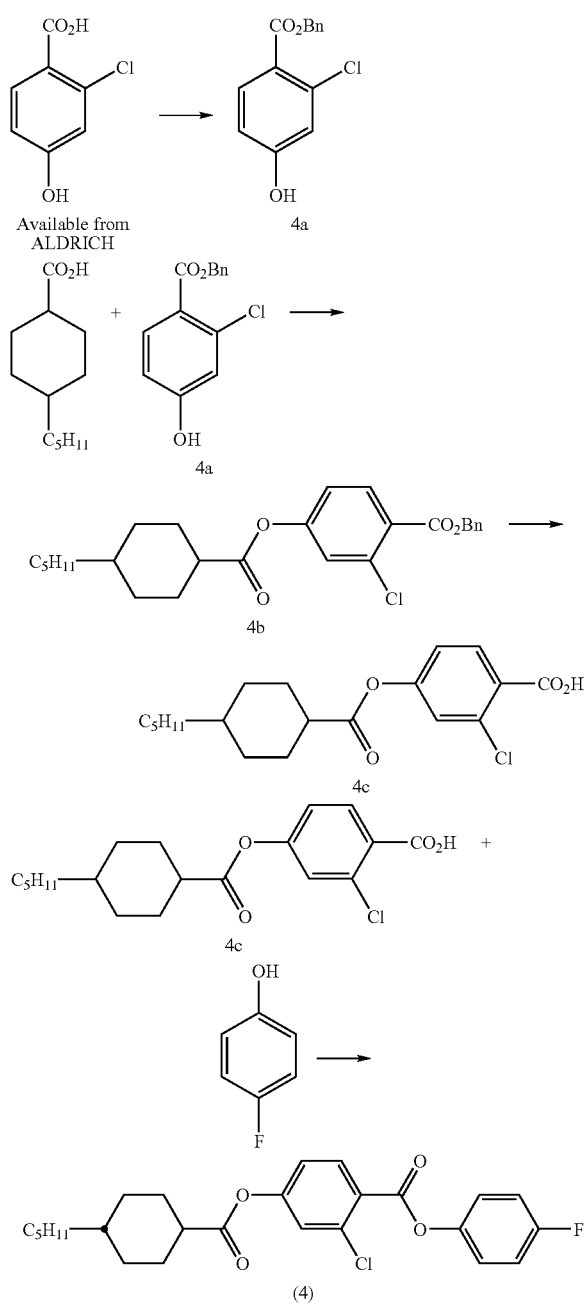

(Preparation of Compound 4a)

Benzyl bromide (39.6 g) was added dropwise to an acetonitrile solution (400 ml) containing 2-chloro-4-hydroxybenzoic acid (20 g) (manufactured by ALDRICH) and CsF-Celite (58.4 g) (prepared according to Synthetic Communications, 28 (11), pp. 2021-2026 (1998)), and the mixture was stirred while heated under reflux for 3 hours. The reaction solution was concentrated under reduced pressure; ethyl acetate (400 ml) was added; and the mixture was filtered. The filtrate was condensed under reduced pressure; the concentrated residue was purified by silica gel column chromatography (developing solvent: ethyl acetate/hexane: 1/2); and the crude crystal obtained was recrystallized from ethyl acetate/hexane, to give a compound 4a (26.7 g).

(Preparation of Compound 4b)

A methylene chloride solution (50 ml) containing dicyclocarbodiimide (9.4 g) was added to a methylene chloride solution (100 ml) containing a compound 4a (10 g), trans-pentyl-cyclohexanecarboxylic acid (7.6 g) (manufactured by Wako Pure Chemical Industries) and dimethylaminopyridine (0.9 g), and the mixture was stirred while heated under reflux for one hour. The reaction solution was filtered and added to ethyl acetate/1N hydrochloric acid water; the organic layer was washed with aqueous 1 N hydrochloric acid, dried with magnesium sulfate, and concentrated under reduced pressure. Purification of the concentrated residue by silica gel column chromatography (developing solvent:ethyl acetate/hexane: 1/6) gave a compound 4b (15.8 g).

(Preparation of Compound 4c)

10% Pd/C (2.0 g) was added to an isopropyl alcohol (150 ml)/THF (50 ml) mixture solution containing the compound 4b (15.8 g), and the mixture was stirred under normal pressure while hydrogen gas was supplied for 6 hours. The reaction solution was filtered through Celite and concentrated under reduced pressure. The concentrated residue was recrystallized from ethyl acetate/hexane, to give a compound 4c (12.3 g).

(Preparation of Nematic Liquid Crystal Compound (4))

A methylene chloride solution (10 ml) containing dicyclohexyl carbodiimide (1.4 g) was added dropwise into a methylene chloride solution (20 ml) containing the compound 4c (2.0 g), p-fluorophenol (0.64 g) (manufactured by Wako Pure Chemical Industries) and dimethylaminopyridine (0.14 g), and the mixture was stirred while heated under reflux for one hour. The reaction solution was poured into chloroform/aqueous 1 N hydrochloric acid; the mixture was filtered; the organic layer was washed with aqueous 1 N hydrochloric acid, dried with magnesium sulfate, and concentrated under reduced pressure.

The concentrated residue was purified by silica gel column chromatography (developing solvent:ethyl acetate/hexane: 1/8), and the crude crystal obtained was recrystallized from isopropyl alcohol, to give a nematic liquid crystal compound 4 (2.1 g).

The compound was identified by elemental analysis and NMR and MASS spectra. The appearance was a white solid. The nematic liquid crystal compound (4) was confirmed to be in the nematic phase at 25° C. (room temperature) under a polarization microscope.

(Refractive Anisotropy Δn)

The refractive anisotropy Δn of the nematic liquid crystal compound (4), as determined by extrapolation by using a liquid crystal E-7 manufactured by Merck & Co., Inc., was 0.097.

(Dielectric Anisotropy Δ∈)

The dielectric anisotropy Δ∈ of the nematic liquid crystal compound (4) obtained was determined by extrapolation by using a liquid crystal MLC-6608 manufactured by Merck & Co., Inc.

Δ∈ (100 Hz): +7.8

Δ∈ (30 kHz): −2.7

<Nematic Liquid Crystal Compound (12)>

—Second Nematic Liquid Crystal Compound—

A nematic liquid crystal compound (12) was prepared according to the following scheme.

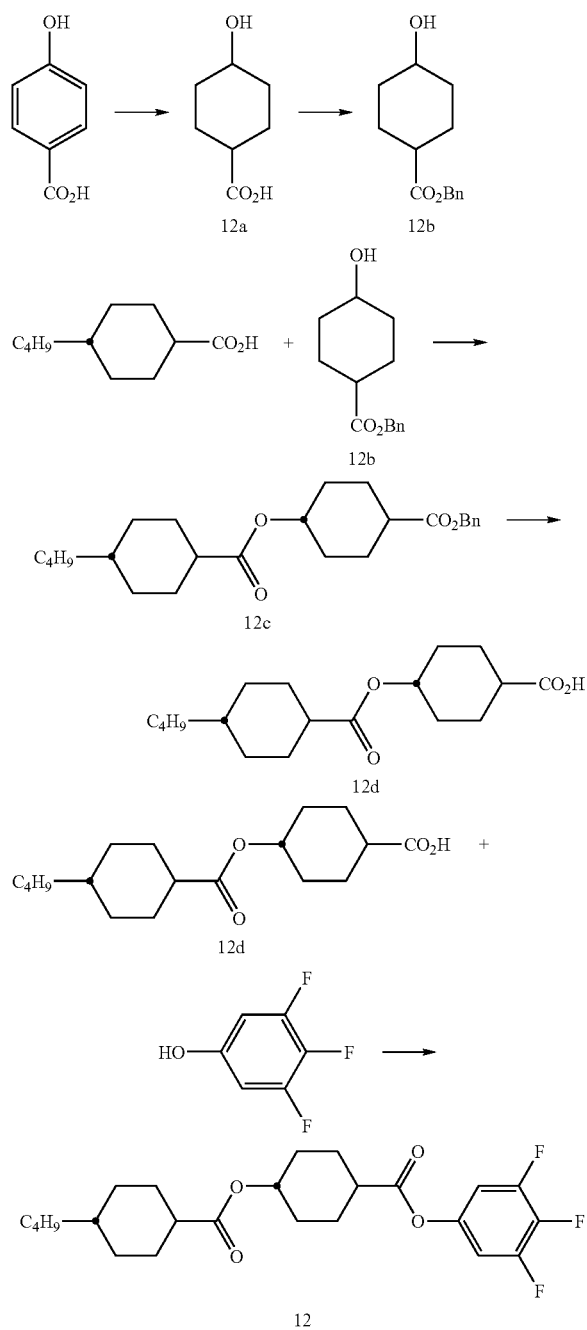

(Preparation of Compound 12a)

An aqueous solution (500 ml) containing 4-hydroxybenzoic acid (100 g) (manufactured by Tokyo Kasei Kogyo Co. Ltd.), Ru/C (35 g) and KOH (90.9 g) was stirred under pressurized hydrogen (7.5 MPa) at 150° C. for 9 hours. The reaction solution was filtered through Celite, and conc. hydrochloric acid was added thereto until the solution became pH 1 while the solution was cooled in an ice bath. After extraction with ethyl acetate, the extract was dried with magnesium sulfate and condensed under reduce pressure. The concentrated residue was recrystallized from isopropyl alcohol/hexane, to give a compound 12a (16.2 g).

(Preparation of Compound 12b)

Benzyl bromide (23.1 ml) was added dropwise to an acetonitrile solution (280 ml) containing the compound 12a (14.1 g) and CsF-Celite (49 g) (prepared according to SYNTHETIC COMMUNICATIONS, 28 (11), 2021-2026 (1998)), and the mixture was stirred while heated under reflux for 3 hours. The reaction solution was concentrated under reduced pressure, ethyl acetate (300 ml) was added thereto; and the mixture was filtered. The filtrate was concentrated under reduced pressure, and the concentrated residue was purified by silica gel column chromatography (developing solvent:ethyl acetate/hexane: 1/5 to 1/1), to give a compound 12b (22.8 g).

(Preparation of Compound 12c)

A methylene chloride solution (30 ml) containing dicyclocarbodiimide (3.2 g) was added dropwise to a methylene chloride solution (30 ml) containing the compound 12b (3 g), trans-butylcyclohexanecarboxylic acid (2.8 g) (manufactured by Wako Pure Chemical Industries) and dimethylaminopyridine (0.3 g), and the mixture was stirred while heated under reflux for one hour. The reaction solution was poured into ethyl acetate/aqueous 1 N hydrochloric acid; the mixture was filtrated; and the organic layer was washed with aqueous 1 N hydrochloric acid, dried with magnesium sulfate and concentrated under reduced pressure. The concentrated residue was purified by silica gel column chromatography (developing solvent:ethyl acetate/hexane: 1/4) and recrystallized from ethanol, to give a compound 12c (4.1 g).

(Preparation of Compound 12d)

5% Pd/C (0.7 g) was added to an isopropyl alcohol (60 ml) solution of the compound 12c (4.1 g), and the mixture was stirred under normal pressure while hydrogen gas was supplied for 3 hours. The reaction solution was filtered through Celite and concentrated under reduced pressure. The concentrated residue recrystallized from ethyl acetate/hexane, to give a compound 12d (3.0 g).

(Preparation of Nematic Liquid Crystal Compound (12))

A methylene chloride solution (10 ml) containing dicyclohexyl carbodiimide (0.8 g) was added dropwise to a methylene chloride solution (10 ml) containing the compound 12d (1.0 g), 3,4,5-trifluorophenol (0.48 g) (manufactured by Wako Pure Chemical Industries) and dimethylaminopyridine (0.08 g), and the mixture was stirred while heated under reflux for one hour. The reaction solution was poured into chloroform/aqueous 1 N hydrochloric acid; the mixture was filtered; and the organic layer was washed with aqueous 1 N hydrochloric acid, dried with magnesium sulfate and concentrated under reduced pressure.

The concentrated residue was purified by silica gel column chromatography (developing solvent:ethyl acetate/hexane: 1/10); the crude crystal obtained was recrystallized from ethanol, to give a nematic liquid crystal compound 12 (0.72 g). The compound was identified by elemental analysis and NMR and MASS spectra. The appearance was white solid. The nematic liquid crystal compound (12) was confirmed to be in the crystalline state at 25° C. (room temperature) and did not form a smectic A phase when heated, by observation under a polarization microscope while heating the sample on a glass substrate with a hot stage.

(Refractive Anisotropy Δn)

The refractive anisotropy Δn of the nematic liquid crystal compound (12) obtained was determined by extrapolation by using a liquid crystal E-7 manufactured by Merck & Co., Inc.

Δn: 0.03

(Dielectric Anisotropy Δ∈)

The dielectric anisotropy Δ∈ of the liquid crystal compound 12 obtained was determined by extrapolation by using a liquid crystal MLC-6608 manufactured by Merck & Co., Inc.

Δ∈ (100 Hz): −0.84
Δ∈ (30 kHz): −4.66

<Liquid Crystal Additive 43a>
—Additive—

A liquid crystal additive 43a was prepared according to the following scheme.

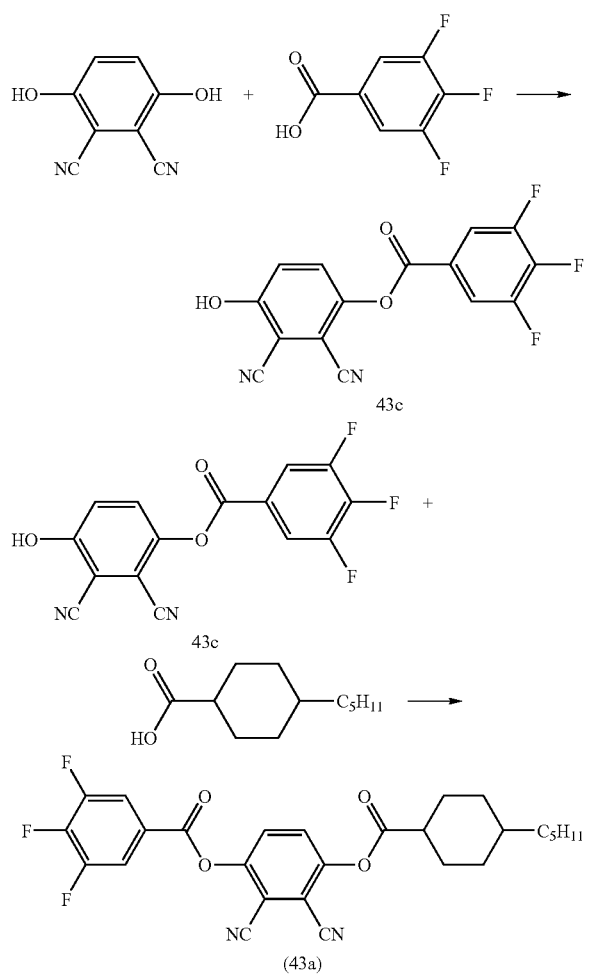

(Preparation of Compound 43c)

A methylene chloride solution (20 ml) containing dicyclohexyl carbodiimide (7.1 g) was added dropwise to a DMF solution (100 ml) containing 2,3-dicyanohydroquinone (5 g) (manufactured by Wako Pure Chemical Industries), 3,4,5-trifluorobenzoic acid (5.5 g) (manufactured by Wako Pure Chemical Industries) and dimethylaminopyridine (0.8 g), and the mixture was stirred at 45° C. for 2 hours. The reaction solution was poured into ethyl acetate/aqueous 1 N hydrochloric acid; the mixture was filtrated; and the organic layer was washed with aqueous 1 N hydrochloric acid, dried with magnesium sulfate and concentrated under reduced pressure. The concentrated residue was purified by silica gel column chromatography (developing solvent:ethyl acetate/hexane: 3/1), and the crude crystal obtained was recrystallized from methanol/water, to give a compound 43c (4.2 g).

(Preparation of Liquid Crystal Additive 43a)

Thionyl chloride (0.33 ml) was added to an ethyl acetate solution (20 ml) containing trans-pentylcyclohexanecarboxylic acid (0.75 g) (manufactured by Wako Pure Chemical Industries), and the mixture was stirred at 85° C. for 2 hours. The mixture was added dropwise to an acetonitrile solution (20 ml) containing the compound 43c (1 g) and potassium carbonate (2.2 g) in an ice bath, and the mixture was stirred for 2 hours. The reaction solution was poured into ethyl acetate/aqueous 1 N hydrochloric acid; the organic layer was washed with aqueous 1 N hydrochloric acid and then with aqueous saturated sodium chloride, dried with magnesium sulfate, and concentrated under reduced pressure. The concentrated residue was purified by silica gel column chromatography (developing solvent:ethyl acetate/hexane: 1/5), and the crude crystal obtained was recrystallized from ethanol, to give a liquid crystal additive (43) (0.64 g). The compound was identified by elemental analysis and NMR and MASS spectra. The appearance was a white solid.

The dielectric anisotropy Δ∈ of the liquid crystal additive 43a obtained was determined by extrapolation by using a liquid crystal MLC-6608 manufactured by Merck & Co., Inc.

Δ∈ (100 Hz): −11.7
Δ∈ (30 kHz): −13.2

<Nematic Liquid Crystal Compound (51)>
—Liquid Crystal III—

A nematic liquid crystal compound 51 was prepared according to the following scheme.

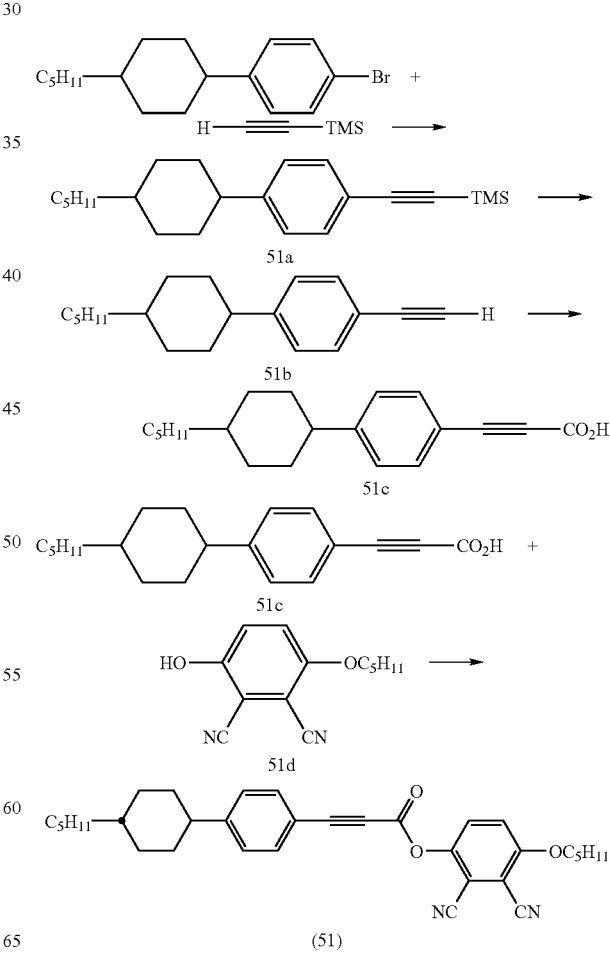

(Preparation of Compound 51a)

A tetrahydrofuran solution (70 ml) containing trans-4-pentylcyclohexylbromobenzene (20 g) (manufactured by Kanto Kagaku), $Pd(PhCN)_2Cl_2$ (0.75 g), triethylamine (10.8 ml), trimethylsilyl acetylene (11 ml) (manufactured by Wako Pure Chemical Industries), tri-tert-butylphosphine (0.8 mg) (manufactured by Wako Pure Chemical Industries) and copper iodide (0.36 g) was stirred at room temperature under nitrogen atmosphere for 8 hours. 200 ml of hexane was added to the reaction solution, and the mixture was purified by silica gel column chromatography (developing solvent:hexane), to give a compound 51a (22.8 g).

(Preparation of Compound 51b)

1 M tetrabutylammonium fluoride THF solution (70 ml) was added dropwise to a tetrahydrofuran solution (100 ml) containing the compound 51a (22.8 g), and the mixture was stirred for 1 hours while the mixture was cooled in an ice bath. The reaction solution was poured into hexane/aqueous 1 N hydrochloric acid, and the organic layer was washed with aqueous 1 N hydrochloric acid and then with aqueous saturated sodium chloride solution, dried with magnesium sulfate, and concentrated under reduced pressure. The concentrated residue was purified by silica gel column chromatography (developing solvent:hexane), and the crude crystal obtained was recrystallized from isopropyl alcohol, to give a compound 51b (12.1 g).

(Preparation of Compound 51c)

1.6 M n-butyllithium hexane solution (7.9 ml) was added dropwise to a tetrahydrofuran solution (30 ml) containing the compound 51b (2.7 g) at −78° C., and the mixture was stirred for 2 hours. The reaction solution was stirred while bubbled with carbon dioxide for four hours. The reaction solution was poured into ethyl acetate/aqueous 1 N hydrochloric acid; the organic layer was washed with aqueous 1 N hydrochloric acid and then with aqueous saturated sodium chloride solution, dried with magnesium sulfate, and concentrated under reduced pressure. The crude crystal was washed with hexane under heat, to give a compound 51c (2.9 g).

(Preparation of Nematic Liquid Crystal Compound (51))

A methylene chloride solution (5 ml) containing dicyclohexyl carbodiimide (0.83 g) was added dropwise to a methylene chloride solution (15 ml) containing dimethylaminopyridine (0.08 g) and a compound 51d (0.77 g) prepared according to the preparative method described in Mol. Cryst. Liq. Cryst., 94,109-118 (1983) by using the compound 51c (1 g) and 2,3-dicyanohydroquinone (manufactured by Wako Pure Chemical Industries), and the mixture was stirred as heated under reflux for one hour. The reaction solution was poured into ethyl acetate/aqueous 1 N hydrochloric acid; the mixture was filtrated; and the organic layer was washed with aqueous 1 N hydrochloric acid, dried with magnesium sulfate and concentrated under reduced pressure. The concentrated residue was purified by silica gel column chromatography (developing solvent:ethyl acetate/hexane: 1/3), and the crude crystal obtained was recrystallized from ethanol, to give a nematic liquid crystal compound 51 (1.2 g). The compound was identified by elemental analysis and NMR and MASS spectra. The appearance was white solid. The nematic liquid crystal compound (51) was confirmed to be in the crystalline state at 25° C. (room temperature) and did not form a smectic A phase when heated, by observation under a polarization microscope while heating the sample on a glass substrate with a hot stage.

The dielectric anisotropy $\Delta \in$ of the nematic liquid crystal compound (51) obtained was determined by extrapolation by using a liquid crystal MLC-6608 manufactured by Merck & Co., Inc.

$\Delta \in$ (100 Hz): −13.1

$\Delta \in$ (30 kHz): −22.5

It was thus found that the nematic liquid crystal compound (51) showed dielectric anisotropy of the liquid crystal III shown in FIG. 3.

Example 1

<Preparation of Dual-frequency-addressing Induced-smectic A (SmA) Liquid Crystal>

(Preparation of Dual-frequency-addressing Induced-SmA Liquid Crystal 1)

The first nematic liquid crystal compound, second nematic liquid crystal compound, additive, and liquid crystal III shown in the following Table 3 were prepared by methods those described above. The dielectric property, the physical state at 25° C. (room temperature), and the transition temperature of each liquid crystal compound were determined by methods similar to those above, and confirmed them whether they correspond to any of the first nematic liquid crystal compound, second nematic liquid crystal compound, additive, and liquid crystal III. The results are summarized in Table 3.

Then, a mixture of 40 mg of the first nematic liquid crystal compound (1), 40 mg of the first nematic liquid crystal compound (2), and 20 mg of the second nematic liquid crystal compound (12) was heated on a hot plate at 180° C. for 1 hour, cooled to room temperature, and left overnight, to give a dual-frequency-addressing induced-SmA liquid crystal 1.

The SmA liquid crystal 1 obtained was shown to be in the smectic A phase by observation under a polarization microscope.

(Preparation of Dual Frequency Addressing Induced-SmA Liquid Crystals 2 to 12)

The dual frequency addressing induced-SmA liquid crystals 2 to 12 shown in the following Table 3 were prepared in the same manner.

TABLE 3

| Dual-frequency SmA liquid crystal | Component ratio (wt %) | Transition temperature | Dielectric property $\Delta \epsilon$ | Remarks |
|---|---|---|---|---|
| 1 | 1st.:1(40%) 1st.:2(40%) 2nd.:12(20%) | SmA 47 N 101 Iso | 100 Hz: +4.0 30 kHz: −5.6 | The invention |
| 2 | 1st.:1(37.5%) 1st.:2(37.5%) 2nd:23(25%) | SmA 45 N | 100 Hz: +5.5 30 kHz: −1.9 | The invention |
| 3 | 1st.:1(40%) 1st.:2(40%) 2nd:22(20%) | SmA 56 N | 100 Hz: +5.0 30 kHz: −2.4 | The invention |

TABLE 3-continued

| Dual-frequency SmA liquid crystal | Component ratio (wt %) | Transition temperature | Dielectric property Δε | Remarks |
|---|---|---|---|---|
| 4 | 1st.:1(35%)<br>1st.:2(35%)<br>2nd:18(15%)<br>Additive:43a(15%) | SmA 94 N 125 Iso | 100 Hz: +3.8<br>30 kHz: −5.9 | The invention |
| 5 | 1st.:1(34.25%)<br>1st.:2(34.25%)<br>2nd:18(2%)<br>2nd:15a(12.7%)<br>Additive:43a(16.8%) | SmA 54 N 119 Iso | 100 Hz: +7.0<br>30 kHz: −5.3 | The invention |
| 6 | 1st.:1(37.5%)<br>1st.:2(37.5%)<br>2nd:18(15%)<br>III:51(10%) | SmA 65 N 121 Iso | 100 Hz: +5.8<br>30 kHz: −4.5 | The invention |
| 7 | 1st.:1(30%)<br>1st.:2(30%)<br>2nd:15a(10.2%)<br>2nd:35(14.8%)<br>2nd:36(15.0%) | SmA 72 N 135 Iso | 100 Hz: +8.3<br>30 kHz: −3.4 | The invention |
| 8 | 1st.:1(29.9%)<br>1st.:2(29.9%)<br>2nd:15a(9.9%)<br>2nd:35(9.9%)<br>2nd:36(10.2%)<br>III:53(10.2%) | SmA 54 N | 100 Hz: +7.6<br>30 kHz: −5.2 | The invention |
| 9 | 1st.:1(35%)<br>1st.:2(35%)<br>2nd:15a(20%)<br>2nd:12(10%) | SmA 53 N | 100 Hz: +9.1<br>30 kHz: −3.1 | The invention |
| 10 | 1st.:1(34.25%)<br>1st.:2(34.25%)<br>2nd:15a(6.2%)<br>2nd:15b(6.3%)<br>2nd:18(2.1%)<br>Additive:43a(8.6%)<br>Additive:43b(8.4%) | SmA 48 N | 100 Hz: +7.6<br>30 kHz: −5.2 | The invention |
| 11 | 1st.:1(29%)<br>1st.:2(29%)<br>2nd:15a(14%)<br>2nd:18(3%)<br>Additive:43a(6.5%)<br>Additive:43b(6.7%)<br>III:53(11.8%) | SmA 46 N | 100 Hz: +8.4<br>30 kHz: −7.6 | The invention |
| 12 | 1st.:1(83%)<br>2nd:18(17%) | SmA 36 N 131 Iso | 100 Hz: +8.0<br>30 kHz: −2.6 | The invention |

(Preparation of Comparative Dual Frequency Addressable SmAdual Frequency Addressable SmA Liquid Crystal)

The dual frequency addressable smectic liquid crystal compound described in Mol. Cryst. Liq. Cryst., Vol. 49, 83-87 (1978) ($R^1$:$C_6H_{13}$, and $R^2$:$C_5H_{11}$ in the following (H-3)) and three kinds of smectic liquid crystal compounds (H-3) different in $R^1$ and $R^2$ alkyl chains were mixed respectively in amounts of 24 mg, 28 mg, 24 mg, and 24 mg, heated on a hot plate at 180° C. for 1 hour, and cooled to room temperature, to give a comparative dual-frequency addressable SmA liquid crystal 1. The smectic liquid crystal (H-3) was a compound in the smectic A phase, by observation under a polarization microscope.

The dielectric anisotropy Δ∈ of the comparative dual-frequency addressable SmA liquid crystal 1 obtained was 1.0 (100 Hz) and −2.2 (30 kHz).

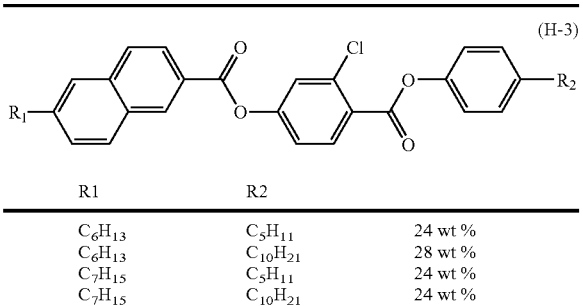

(H-3)

| R1 | R2 | |
|---|---|---|
| $C_6H_{13}$ | $C_5H_{11}$ | 24 wt % |
| $C_6H_{13}$ | $C_{10}H_{21}$ | 28 wt % |
| $C_7H_{15}$ | $C_5H_{11}$ | 24 wt % |
| $C_7H_{15}$ | $C_{10}H_{21}$ | 24 wt % |

Example 2

(Preparation of Dichroic Dye)

A dichroic dye (1-8) was prepared according to the method described in JP-A No. 2003-192664. A dichroic dye (1-14) was prepared according to the method described in JP-A No. 2005-120334.

(Preparation of Liquid Crystal Element)

Each of the liquid crystal compositions according to the invention 1 to 12 prepared in Example 1 and the comparative dual frequency addressable SmAdual frequency addressable SmA liquid crystal 1 was injected into a commercially available liquid crystal cell (having ITO transparent electrodes, an oriented polyimide film (unrubbed), a glass substrate of 0.7 mm, a cell gap of 8 µm, and epoxy-resin sealed, manufactured by E.H.C.) at 180° C., to give liquid crystal elements 1 to 13.

(Measurement of Address Voltage and Response Time)

The response time of the liquid crystal element prepared was determined by applying a rectangular AC voltage (±50 V, 100 Hz) at low frequency and observing the orientational change of the element under a polarization microscope. Results are summarized in Table 4.

TABLE 4

| Liquid crystal element | Response time (sec) | Remarks |
| --- | --- | --- |
| 1 | 3.0 | The invention |
| 2 | 0.8 | The invention |
| 3 | 1.5 | The invention |
| 4 | 4.2 | The invention |
| 5 | 1.3 | The invention |
| 6 | 4.6 | The invention |
| 7 | 2.1 | The invention |
| 8 | 2.3 | The invention |
| 9 | 1.6 | The invention |
| 10 | 0.7 | The invention |
| 11 | 1.0 | The invention |
| 12 | 1.1 | The invention |
| 13 | Without orientational change *22.0 sec (±140 V) | Comparative example |

As apparent from Table 4, liquid crystal elements prepared with a liquid crystal composition according to the invention respond at low voltage in a short period of time.

The crossover frequency of dual frequency addressable liquid crystal is in the relationship parallel with the viscosity, as shown below (see "Liquid Crystal Device Handbook" (Japan Society for the Promotion of Science 142nd Committee Ed., Nikkankogyo Shimbun, 1989), pp. 189 to 192).

Crossover frequency $f_c \propto 1/($Molecular length $L^3 \times$ Viscosity $\eta)$ The crossover frequency fc of the dual frequency addressing induced-SmA liquid crystal composition 5 according to the invention is 4,173, and that of the comparative dual frequency addressable SmA liquid crystal 1 is 295.

These results indicate that the dual frequency addressing induced-SmA liquid crystal compositions according to the invention are less viscous.

Example 3

Independent Addressing Experiment (Preparation of Liquid Crystal Composition 1)

A mixture of dual frequency addressing induced-SmA liquid crystal 5 prepared in Example 1 (93.5 mg), 5.6 mg of a yellow dichroic dye (1-1) and 0.9 mg of a cyan dichroic dye (1-14) was heated on a hot plate at 180° C. for one hour and cooled to room temperature, to give a green liquid crystal composition 1.

(Preparation of Liquid Crystal Composition 2)

A mixture of the dual frequency addressing induced-SmA liquid crystal 6 (96.5 mg) prepared in Example 1 and 3.5 mg of magenta dichroic dye (1-8) was heated on a hot plate at 180° C. for one hour and cooled to room temperature, to give a magenta liquid crystal composition 2.

(Configuration of Liquid Crystal Element)

Figure 7:
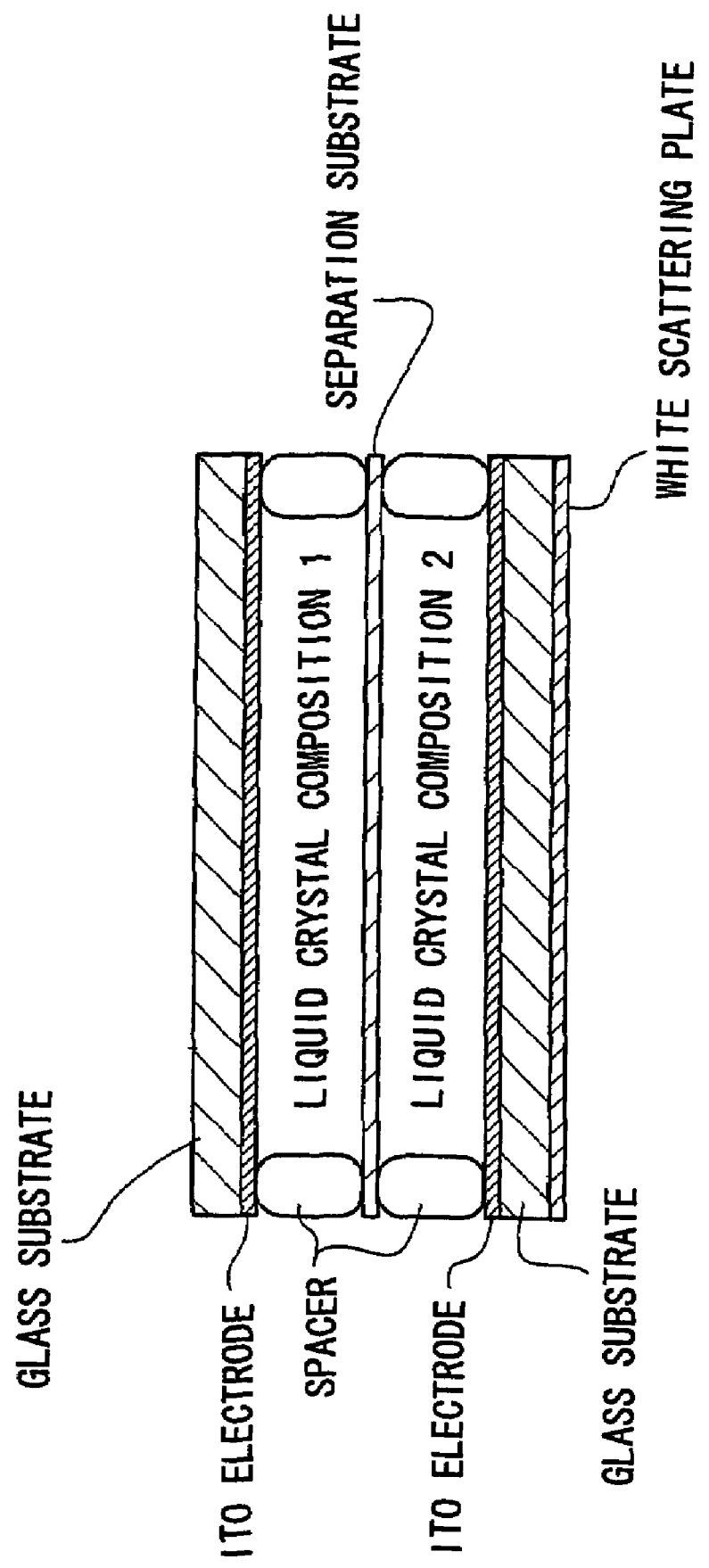
FIG. 7 is a schematic cross sectional view of a liquid crystal element in Embodiment 3.

FIG. 7 shows the configuration of the liquid crystal element prepared in the invention.

Display layers of a liquid crystal composition 1 and a liquid crystal composition 2 that are complementary to each other were placed between a pair of ITO glass substrates (manufactured by EHC); polystyrene spacers (manufactured by Sekisui Chemical Co., Ltd.) were placed between the display layer in such a manner that the respective cell gaps become 8 µm; a polycarbonate separation substrate having a thickness of 10 µm is placed between the display layers; and a white light-scattering plate (manufactured by Yupo Corporation) was placed on the rear face of the non-display-screen-sided glass substrate.

<Evaluation for Color Display>

Rectangular AC voltages at low frequency (100 Hz) and high frequency (30 kHz) were applied to the manufactured liquid crystal element (exhibiting black color at initial state) to conduct color display. The result is shown in Table 5. In the following table, application voltage 1 and application voltage 2 indicate that application voltage 1 was applied and then the application voltage 2 was applied. Further "–" shows no voltage application.

TABLE 5

| Display color | Applied voltage 1 (V/µm) | Applied voltage 2 (V/µm) |
| --- | --- | --- |
| Black (initial) | — | — |
| White | Low frequency · 7.5 | — |
| Magenta | Low frequency · 5 | — |
| Green | Low frequency · 7.5 | High frequency · 10 |
| White to black | Low frequency · 7.5 | High frequency · 13.7 |
| Magenta to black | Low frequency · 5 | High frequency · 10 |
| Green to black | 1. Low frequency · 7.5  2. High frequency · 10 | High frequency · 13.7 |

As apparent from Table 5, it can be seen that a plurality of layers can be addressed independently by using one pair of electrodes. Further, it was shown that the display color was not changed even left for one week and had memory property after turning off the voltage application.

Example 4

(Preparation of Liquid Crystal Composition 3)

A mixture of the dual frequency addressing induced-SmA liquid crystal 11 prepared in Example 1 (94.4 mg) and 5.6 mg of a yellow dichroic dye (1-2) was heated on a hot plate at 180° C. for one hour and cooled to room temperature, to give a liquid crystal composition 3.

(Preparation of Liquid Crystal Composition 4)

A mixture of the dual frequency addressing induced-SmA liquid crystal 5 prepared in Example 1 (96.5 mg) and 3.5 mg of a magenta dichroic dye (1-8) was heated on a hot plate at 180° C. for one hour and cooled to room temperature, to give a liquid crystal composition 4.

(Preparation of Liquid Crystal Composition 5)

A mixture of dual frequency addressing induced-SmA liquid crystal 6 prepared in Example 1 (99.4 mg) and 0.6 mg of a cyan dichroic dye (1-14) was heated on a hot plate at 180° C. for one hour and cooled to room temperature, to give a liquid crystal composition 5.

(Configuration of Liquid Crystal Element)

A liquid crystal element was prepared in a similar manner to Example 3. However, the liquid crystal element of Example 3 was a two-layered liquid crystal layer, but the element of Example 4 was three-layered.

<Evaluation for Color Display>

Rectangular alternating AC voltages at low frequency (100 Hz) and a high frequency (30 kHz) were applied to the manufactured liquid crystal element to conduct color display. The result is shown in Table 6. In the following table, the application voltage 1, application voltage 2, and the application voltage 3 shows that the application voltage 2 was applied after application of the application voltage 1 and the application voltage 3 was applied after application of the application voltage 2. Further "–" shows no voltage application.

TABLE 6

| Display color | Application voltage 1 (V/μm) | Application voltage 2 (V/μm) | Application voltage 3 (V/μm) |
|---|---|---|---|
| Black (Initial state) | — | — | — |
| White | Low frequency: 7.5 | — | — |
| Yellow | Low frequency: 7.5 | High frequency: 7.5 | — |
| Magenta | Low frequency: 7.5 | High frequency: 10 | Low frequency: 3.5 |
| Cyan | Low frequency: 5 | — | — |
| Blue | Low frequency: 3.5 | — | — |
| Green | Low frequency: 5 | High frequency: 7.5 | — |
| Red | Low frequency: 7.5 | High frequency: 10 | — |
| White →Black | Low frequency: 7.5 | High frequency: 13.7 | — |

As apparent from Table 6, it can be seen that a plurality of layers can be addressed independently by using one pair of electrodes. Further, it was shown that the display color was not changed even left for one week and had a memory property after turning off voltage application. The color reproduction range reached 100% in principle and the reflectivity was also improved compared with those of the complementary color lamination as the prior art (constitution formed by laminating layers comprising liquid crystal compositions colored yellow, magenta, and cyan, and layers comprising liquid crystal compositions colored to blue, green, and red respectively in a complementary relationship therewith arranged side by side by the number of two).

The invention provides a liquid crystal composition, a liquid crystal element, a reflective display material and a light-controlling material that operate at low voltage, respond in a short period of time response and have a memory property.

All publications, patent applications, and technical standards mentioned in this specification are herein incorporated by reference to the same extent as if each individual publication, patent application, or technical standard was specifically and individually indicated to be incorporated by reference.

What is claimed is:

1. A dual frequency addressable smectic A liquid crystal composition having a crossover frequency, comprising at least a first nematic liquid crystal compound or composition and a second nematic liquid crystal compound or composition,
   wherein the second nematic liquid crystal compound or composition contains a nematic liquid crystal compound having a polarized group on the molecular major axis of the compound, and the polarized group is a perfluoroalkoxy group having 1 to 10 carbon atoms, a perfluoroalkyl group having 1 to 10 carbon atoms, a halogen atom or a cyano group.

2. The dual frequency addressable smectic A liquid crystal composition of claim 1, wherein a smectic A phase is induced by mixing of at least the first nematic liquid crystal compound or composition and the second nematic liquid crystal compound or composition.

3. The dual frequency addressable smectic A liquid crystal composition of claim 1, wherein the first nematic liquid crystal compound or composition exhibits dual frequency addressability.

4. The dual frequency addressable smectic A liquid crystal composition of claim 1, wherein the second nematic liquid crystal compound or composition exhibits dual frequency addressability.

5. The dual frequency addressable smectic A liquid crystal composition of claim 1, wherein a ratio of the first nematic liquid crystal compound to the second nematic liquid crystal compound is in a range of from 20:80 mol % to 99.9:0.1 mol %.

6. The dual frequency addressable smectic A liquid crystal composition of claim 1, wherein an orientation direction is switched reversibly by change of frequency during application of voltage.

7. The dual frequency addressable smectic A liquid crystal composition of claim 1, further comprising a third liquid crystal compound or composition exhibiting dual frequency addressability, wherein a difference of a dielectric anisotropy $\Delta\epsilon$ between a low frequency and a high frequency of the third liquid crystal compound or composition is 6 or more, and the dielectric anisotropy $\Delta\epsilon$ at the high frequency is −8 or less.

8. The dual frequency addressable smectic A liquid crystal composition of claim 1, further comprising at least one dichroic dye.

9. The dual frequency addressable smectic A liquid crystal composition of claim 1, wherein the first nematic liquid crystal compound and the second nematic liquid crystal compound are represented by the following Formula (1):

Formula (1)

in Formula (1), $D^1$ and $D^2$ each independently represents an arylene group, a heteroarylene group or a bivalent alicyclic hydrocarbon group, $L^1$ represents a bivalent connecting group, $T^1$ and $T^2$ each independently represents a hydrogen atom, an alkyl group, an alkoxy group, an alkoxycarbonyl group, an acyl group, an acyloxy group, a halogen atom or a cyano group, e represents an integer of 1 to 3, m represents an integer of 1 to 3, k is 1 or 2, and f represents an integer of 0 to 3.

10. The dual frequency addressable smectic A liquid crystal composition of claim 9, wherein $L^1$ in Formula (1) is selected from the group consisting of an alkenylene group, an alkynylene group, an ether group, an ester group, a carbonyl group, an azo group, an azoxy group, and an alkyleneoxy group.

11. The dual frequency addressable smectic A liquid crystal composition of claim 9, wherein, in Formula (1), e×m+k represents an integer of 3 or 4.

12. The dual frequency addressable smectic A liquid crystal composition of claim 9, wherein, in Formula (1), e, f, m, and k are selected from the group consisting of the following combinations:
   (I) e=1, f=1, m=2, and k=1;
   (II) e=2, f=1, m=1, and k=1;
   (III) e=2, f=2, m=1, and k=1;
   (IV) e=1, f=1, m=1, and k=2;
   (V) e=1, f=2, m=1, and k=2;
   (VI) e=2, f=1, m=1, and k=2;
   (VII) e=1, f=0, m=2, and k=1.

13. A liquid crystal element having a pair of electrodes, at least one of which is a transparent electrode, and a liquid crystal layer held between the pair of electrodes, the liquid crystal layer comprising at least one dual frequency addressable smectic A liquid crystal composition having a crossover frequency that contains at least a first nematic liquid crystal compound or composition and a second nematic liquid crystal compound or composition, wherein the second nematic liquid crystal compound or composition contains a nematic liquid crystal compound having a polarized group on the molecular major axis of the compound, and the polarized group is a perfluoroalkoxy group having 1 to 10 carbon atoms, a perfluoroalkyl group having 1 to 10 carbon atoms, a halogen atom or a cyano group.

14. The liquid crystal element of claim 13, wherein the liquid crystal layer contains at least two of the dual frequency addressable smectic A liquid crystal compositions having different threshold voltages.

15. The liquid crystal element of claim 14, wherein, when the at least two dual frequency addressable smectic A liquid crystal compositions having different threshold voltages are a first dual frequency addressable smectic A liquid crystal composition and a second dual frequency addressable smectic A liquid crystal composition; a threshold voltage of the first dual frequency addressable smectic A liquid crystal composition at a frequency lower than the crossover frequency is designated as Ea; a threshold voltage of the first dual frequency addressable smectic A liquid crystal composition at a frequency higher than the crossover frequency is designated as E'a; a threshold voltage of the second dual frequency addressable smectic A liquid crystal composition at a frequency lower than the crossover frequency is designated as Eb; and a threshold voltage of the second dual frequency addressable smectic A liquid crystal composition at a voltage higher than the crossover frequency is designated as E'b: Ea is smaller than Eb, and E'a is smaller than E'b.

16. The liquid crystal element of claim 14, wherein, when the at least two dual frequency addressable smectic A liquid crystal compositions having different threshold voltages contain a first dual frequency addressable smectic A liquid crystal composition, a second dual frequency addressable smectic A liquid crystal composition and a third dual frequency addressable smectic A liquid crystal composition; a threshold voltage of the first dual frequency addressable smectic A liquid crystal composition at a frequency lower than the crossover frequency is designated as Ea; a threshold voltage of the first dual frequency addressable smectic A liquid crystal composition at a frequency higher than the crossover frequency is designated as E'a; a threshold voltage of the second dual frequency addressable smectic A liquid crystal composition at a frequency lower than the crossover frequency is designated as Eb; a threshold voltage of the second dual frequency addressable smectic A liquid crystal composition at a frequency higher than the crossover frequency is designated as E'b; a threshold voltage of the third dual frequency addressable smectic A liquid crystal composition at a frequency lower than the crossover frequency is designated as Ec; and a threshold voltage of the third dual frequency addressable smectic A liquid crystal composition at a frequency higher than the crossover frequency as E'c, the following relationships are satisfied: Ea<Eb<Ec, and E40 a<E'b<E'c.

17. The liquid crystal element of claim 16, wherein the first, second and third dual frequency addressable smectic A liquid crystal compositions contain dichroic dyes different in absorption respectively, and each of the dichroic dyes absorbs any one of yellow, magenta, or cyan.

18. The liquid crystal element of claim 13, wherein the liquid crystal layer contains at least two of the dual frequency addressable smectic A liquid crystal compositions having different crossover frequencies.

19. The liquid crystal element of claim 15, wherein the first and the second dual frequency addressable smectic A liquid crystal compositions contain dichroic dyes respectively, and an absorption of the dichroic dye in the first dual frequency addressable smectic A liquid crystal composition and an absorption of the dichroic dye in the second dual frequency addressable smectic A liquid crystal composition have at least one complementary relationship selected from the group consisting of yellow and blue, magenta and green, and cyan and red.

20. The liquid crystal element of claim 13, wherein a plurality of liquid crystal layers are laminated.

21. The liquid crystal element of claim 20, wherein the liquid crystal layers are polymer medium layers containing the dual frequency addressable smectic A liquid crystal compositions dispersed in a polymer medium, and the polymer medium layers are laminated.

22. The liquid crystal element of claim 21, wherein the polymer medium is gelatin.

23. The liquid crystal element of claim 13, wherein the liquid crystal layer contains the dual frequency addressable smectic A liquid crystal composition enclosed in a microcapsule.

24. A reflective display material comprising the liquid crystal element of claim 13.

25. A light-controlling material comprising the liquid crystal element of claim 13.

* * * * *